US006487574B1

(12) United States Patent
Malvar

(10) Patent No.: US 6,487,574 B1
(45) Date of Patent: Nov. 26, 2002

(54) SYSTEM AND METHOD FOR PRODUCING MODULATED COMPLEX LAPPED TRANSFORMS

(75) Inventor: Henrique S. Malvar, Redmond, WA (US)

(73) Assignee: Microsoft Corp., Redmond, WA (US)

(*) Notice: Subject to any disclaimer, the term of this patent is extended or adjusted under 35 U.S.C. 154(b) by 0 days.

(21) Appl. No.: 09/259,669

(22) Filed: Feb. 26, 1999

(51) Int. Cl.$^7$ .............................................. G06F 17/14
(52) U.S. Cl. ...................................... 708/400; 708/402
(58) Field of Search ................................. 708/400, 402, 708/403, 404, 405, 406, 409; 375/260, 261, 263; 702/75, 76, 77

(56) References Cited

U.S. PATENT DOCUMENTS

| | | | | |
|---|---|---|---|---|
| 5,339,265 A | * | 8/1994 | Liu et al. ..................... | 708/400 |
| 5,715,280 A | * | 2/1998 | Sandberg et al. ........... | 375/260 |
| 5,859,788 A | * | 1/1999 | Hou ........................... | 708/400 |

OTHER PUBLICATIONS

D. Kunz and T. Aach, Lapped Directional Transform: A New Transform for Spectral Image Analysis, Proc. IEE Int. Conf. Acoustics, Speech and Signal Processing, Phoenix, AZ 1999. pp. 3433–3436.

S. Wyrsch and A. Kaelin, Adaptive Feedback and Cancelling in Subbands for Hearing Aids, Proc. IEE Int. Conf. Acoustics, Speech and Signal Processing, Phoenix, AZ 1999.

S. Godsill, P. Rayner, and O. Cappe, "Digital audio restoration," in Applications of Digital Signal Processing to Audio and Acoustics, M. Kahrs and K. Brandenburg, Eds. Boston, MA: Kluwer, 1998.

H.S. Malvar, "Biorthogonal and nonuniform lapped transforms coding with reduced blocking and ringing artifacts," IEEE Trans. Signal Processing, vol. 46, pp. 1043–1053, Apr. 1998.

S. Shlien, "The modulated lapped transform, its time-varying forms, and applications to audio coding," IEEE Trans. Speech Audio Processing, vol. 5, pp. 359–366, Jul. 1997.

P.L. De Leon and D, M. Etter, Acoustic echo cancellation using subband adaptive filtering, in Subband and Wavelet Transforms, A.N. Askansu and M.J.T. Smith, Eds. Boston, MA: Kluwer, 1996. pp. 347–367.

M. Vetterli and J. Kovacevic, Wavelets and Subband Coding. Englewood Cliffs, NJ: Prentice Hall, 1995. Content Section, pp. Vii–Xii.

P.P. Vaildyanathan, Multirate Systems and Filter Banks. Englewood Cliffs, NJ: Prentice Hall, 1993. Content Section, pp. Vii–Xi.

(List continued on next page.)

Primary Examiner—Ohuong Dinh Ngo
(74) Attorney, Agent, or Firm—Lyon & Harr, LLP; Katrina A. Lyon

(57) ABSTRACT

The present invention is embodied in a system and method for performing spectral analysis of a digital signal having a discrete duration by spectrally decomposing the digital signal at predefined frequencies uniformly distributed over a sampling frequency interval into complex frequency coefficients so that magnitude and phase information at each frequency is immediately available to produce a modulated complex lapped transform (MCLT). The system includes real and imaginary window processors and real and imaginary transform processors. The real and imaginary window processors receive the input signal and apply and compute butterfly coefficients for the real and imaginary parts of the signal to produce resulting real and imaginary vectors, respectively. The real and imaginary transform processors compute spatial transforms on the real and imaginary vectors to produce real and imaginary transform coefficient of the MCLT, respectively. The MCLT is a biorthogonal spectral transformation system, in the sense that the original time domain signal can be reconstructed exactly by an inverse MCLT operator.

28 Claims, 11 Drawing Sheets

OTHER PUBLICATIONS

R.W. Young and N. Kingsbury, "Frequency domain motion estimation using a complex lapped transform," IEEE Trans. Image Processing, vol. 2, pp. 2–17, Jan. 1993.

A. Gilloire and M. Vetterli, "Adaptive filtering in subbands with critical sampling: analysis, experiments, and applications to acoustic echo cancellation," IEEE Trans. Signal Processing, vol. 40, pp. 1862–1875, Aug. 1992.

H.S. Malva, Signal Processing with Lapped Transforms. Boston: Artech House, 1992. Content Section, pp. Vii–Xi.

K.R. Rao and P. Yip, Discrete Cosine Transform: Algorithms, Advantages, and Applications. New York; Academic Press, 1990. Content Section, pp. V–Viii.

J. Princen, A.W. Johnson, and A.B. Bradley, "Subband/transform coding using filter bank designs based on time domain aliasing cancellation," Proc. IEEE ICASSP, Dallas, TX, Apr. 1987, pp. 2161–2164.

H. Malvar. "Enhancing the Performance of Subband Audio Coders for Speech Signals." Presented at the IEEE International Symposium on Circuits and Systems, pp. 1–4— Monterey, VA, Jun. 1998.

K. Brandenburg and M. Kahrs. "Applications of Digital Signal Processing to Audio and Acoustics," Kluwer Academic, 1998, pp. 133–194.

* cited by examiner

SYSTEM AND METHOD FOR PRODUCING MODULATED COMPLEX LAPPED TRANSFORMS

BACKGROUND OF THE INVENTION

1. Field of the Invention

The present invention relates to a system and method for producing modulated complex lapped transforms (MCLTs), and in particular, a system and method for incorporating complex coefficients to modulated lapped transforms (MLTS) to derive MCLTs.

2. Related Art

In many engineering and scientific applications, it is desirable to analyze a signal in the frequency domain or represent the signal as a linear superposition of various sinusoids. The analysis of the amplitudes and phases of such sinusoids (the signal spectrum) can be useful in multimedia applications for operations such as noise reduction, compression, and pattern recognition, among other things. The Fourier transform is a classical tool used for frequency decomposition of a signal.

The Fourier transform breaks a signal down to component frequencies. However, its usefulness is limited to signals that are stationary, i.e., spectral patterns of signals that do not change appreciably with time. Since most real-world signals, such as audio and video signals, are not stationary signals, localized frequency decompositions are used, such as time-frequency transforms. These transforms provide spectral information that is localized in time.

One such transform is the discrete cosine transform (DCT). The DCT breaks a signal down to component frequencies. For instance, a block of M samples of the signal can be mapped to a block of M frequency components via a matrix of M×M coefficients. To ensure a good energy compaction performance, the DCT approximates the eigenvectors of the autocorrelation matrix of typical signal blocks. Basis functions for the DCT (for type II) can be defined as:

$$a_{nk} = c(k)\sqrt{\frac{2}{M}} \cos\left[\left(n + \frac{1}{2}\right)\frac{k\pi}{M}\right]$$

where, $a_{nk}$ is the element of an A transformation matrix in the nth row and kth column, or equivalently, the nth sample of the kth basis function. For orthonormality, the scaling factors are chosen as:

$$c(k) \equiv \begin{cases} 1/\sqrt{2} & \text{if } k = 0 \\ 1 & \text{otherwise} \end{cases}$$

The transform coefficients X(k) are computed from the signal block samples x(n) by:

$$X(k) = \sum_{n=0}^{M-1} a_{nk} x(n)$$

The DCT can be used for convolution and correlation, because it satisfies a modified shift property. Typical uses of the DCT are in transform coding, spectral analysis, and frequency-domain adaptive filtering.

An alternative transform for spectral analysis is the discrete cosine transform, type IV (DCT-IV). The DCT-IV is obtained by shifting the frequencies of the DCT basis functions in eqn. (A) by $\pi/2M$, in the form:

$$a_{nk} = \sqrt{\frac{2}{M}} \cos\left[\left(n + \frac{1}{2}\right)\left(k + \frac{1}{2}\right)\frac{\pi}{M}\right]$$

Unlike the DCT, the scaling factor is identical for all basis functions. It should be noted that the DCT-IV basis functions have a frequency shift, when compared to the DCT basis. Nevertheless, these transforms still lead to orthogonal basis.

The DCT and DCT-IV are useful tools for frequency-domain signal decomposition. However, they suffer from blocking artifacts. In typical applications, the transform coefficients X(k) are processed in some desired way: quantization, filtering, noise reduction, etc. Reconstructed signal blocks are obtained by applying the inverse transform to such modified coefficients. When such reconstructed signal blocks are pasted together to form the reconstructed signal (e.g. a decoded audio or video signal), there will be discontinuities at the block boundaries.

The modulated lapped transform (MLT) eliminates such discontinuities. The MLT is a particular form of a cosine-modulated filter bank that allows for perfect reconstruction. For example, a signal can be recovered exactly from its MLT coefficients. Also, the MLT does not have blocking artifacts, namely, the MLT provides a reconstructed signal that decays smoothly to zero at its boundaries, avoiding discontinuities along block boundaries. In addition, the MLT has almost optimal performance for transform coding of a wide variety of signals. Because of these properties, the MLT is being used in many applications, such as many modern audio and video coding systems, including Dolby AC-3, MPEG-2 Layer III, and others.

However, one disadvantage of the MLT for some applications is that its transform coefficients are real, and so they do not explicitly carry phase information. In some multimedia applications, such as audio processing, complex subbands are typically needed by noise reduction devices, via spectral subtraction, and acoustic echo cancellation devices.

Therefore what is needed is a new transformation system and method that produces complex subbands for multimedia devices and audio processing devices, such as noise reduction devices and echo cancellation devices. Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is embodied in a system and method for performing spectral analysis of a digital signal having a discrete duration. The present invention performs spectral analysis by spectrally decomposing the digital signal at predefined frequencies uniformly distributed over a sampling frequency interval into complex frequency coefficients so that magnitude and phase information at each frequency is immediately available.

Namely, the system of the present invention produces a modulated complex lapped transform (MCLT) and includes real and imaginary window processors and real and imaginary transform processors. Each window processor has window functions and operators. The real window processor receives the input signal as sample blocks and applies and computes butterfly coefficients for the real part of the signal to produce resulting real vectors. The imaginary window processor receives the input signal as sample blocks and applies and computes butterfly coefficients for the imaginary part of the signal to produce resulting imaginary vectors. The real transform processor computes a spatial transform on the real vectors to produce a real transform coefficient for the MCLT. The imaginary transform processor computes a spatial transform on the imaginary vectors to produce an imaginary transform coefficient for the MCLT.

In addition, the system can include inverse transform module for inverse transformation of the encoded output. The inverse transform module can include components that are the exact inverse of the inverse real and imaginary transform processors and the real and imaginary inverse window processors. The encoded output is received and processed by inverse real and imaginary transform processors, and then received and processed by real and imaginary inverse window processors to produce an output signal that substantially matches the input signal.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Introduction

The MCLT of the present invention can achieve short-time spectral decomposition of signals with explicit magnitude and phase information and perfect signal reconstruction. For instance, the MCLT of the present invention can use sine functions at defined frequencies and phases to generate an additional orthogonal decomposition. The defined frequencies and phases are preferably the same that the MLT basis functions use for cosine modulation of a particular window function with certain properties.

In addition, the MCLT of the present invention is easily integrated with MLT-based systems. Once the MCLT of a signal has been computed, its MLT can be trivially obtained simply by discarding the imaginary parts. The present invention can use both the cosine and sine modulating functions for producing a frame decomposition with desirable properties. Further, the cosine and sine modulations can be used to compute the real and imaginary parts of a transform that has all the magnitude/phase properties of the short-time Fourier transform, while allowing for perfect signal reconstruction. Consequently, the novel MCLT of the present invention can be used in applications such as high-fidelity audio coding, adaptive filtering, acoustic echo cancellation, noise reduction, or any other application where high-fidelity signal reconstruction is required.

Exemplary Operating Environment

Figure 1:
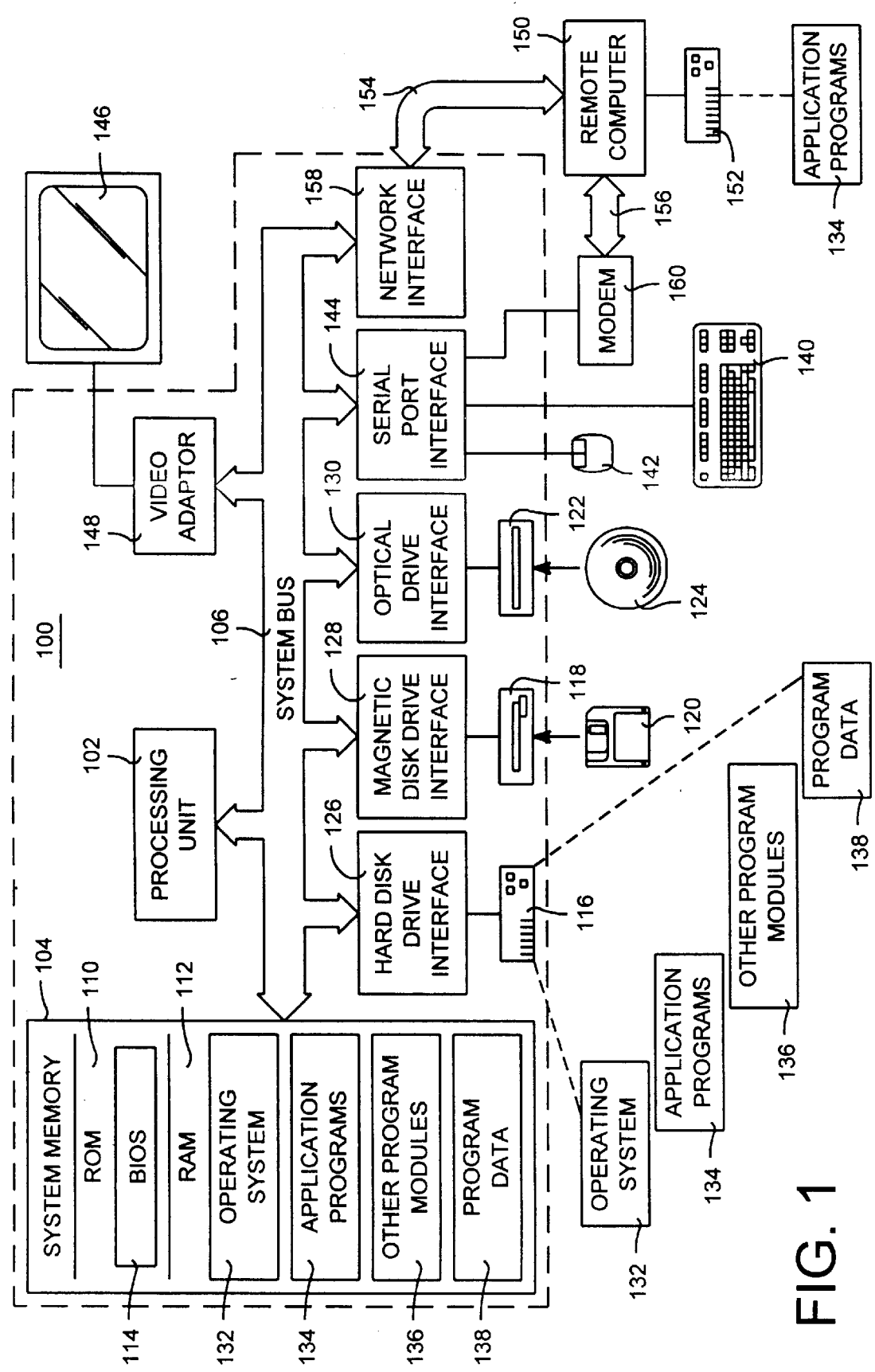
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 1, an exemplary system for implementing the invention includes a general purpose computing device in the form of a conventional computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes computer storage media in the form of read only memory (ROM) 110 and random access memory (RAM) 112. A basic input/output system 114 (BIOS), containing the basic routines that helps to transfer information between elements within computer 100, such as during start-up, is stored in ROM 110. The computer 100 may include a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 128, and optical disk drive 122 are connected to the system bus 106 by a hard disk drive interface 126, a magnetic disk drive interface 128, and an optical drive interface 130, respectively. The drives and their associated computer-readable media provide storage of computer readable instructions, data structures, program modules and other data for the computer 100. Although the exemplary environment described herein employs a hard disk, a removable magnetic disk 120 and a removable optical disk 130, it should be appreciated by those skilled in the art that other types of computer readable media can store data that is accessible by a computer. Such computer readable media can be any available media that can be accessed by computer 100. By way of example, and not limitation, such computer readable media may comprise communication media and computer storage media. Communication media typically embodies computer readable instructions, data structures, program modules or other data in a modulated data signal such as a carrier wave or other transport mechanism and includes any information delivery media. The term "modulated data signal" means a signal that has one or more of its characteristics set of changed in such a manner as to encode information in the signal. By way of example, and not limitation, communication media includes wired media such as wired network or direct wired connection, and wireless media such as acoustic, RF, infrared and other wireless media. By way of example, and not limitation, communication media includes wired media such as a wired network or direct wired connection, and wireless media such as acoustic, RF, infrared and other wireless media. Computer storage media includes any method or technology for the storage of information such as computer readable instructions, data structures, program modules or other data. By way of example, such storage media includes RAM, ROM, EPROM, flash memory or other memory technology, CD-ROM, digital video disks (DVD) or other optical disk storage, magnetic cassettes, magnetic tape, magnetic disk storage or other magnetic storage devices, or any other medium which can be used to store the desired information and which can be accessed by computer 100. Combinations of any of the above should also be included within the scope of computer readable media.

A number of program modules may be stored on the hard disk, magnetic disk 120, optical disk 124, ROM 110 or RAM 112, including an operating system 132, one or more application programs 134, other program modules 136, and program data 138. A user may enter commands and information into the computer 100 through input devices such as a keyboard 140 and pointing device 142. Other input devices (not shown) may include a microphone, joystick, game pad, satellite dish, scanner, or the like. These and other input devices are often connected to the processing unit 102 through a serial port interface 144 that is coupled to the system bus 106, but may be connected by other interfaces, such as a parallel port, game port or a universal serial bus (USB). A monitor 146 or other type of display device is also connected to the system bus 106 via an interface, such as a video adapter 148. In addition to the monitor 146, computers may also include other peripheral output devices (not shown), such as speakers and printers.

The computer 100 may operate in a networked environment using logical connections to one or more remote computers, such as a remote computer 150. The remote computer 150 may be a personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and Internet.

When used in a LAN networking environment, the computer 100 is connected to the local network 154 through a network interface or adapter 158. When used in a WAN networking environment, the computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the computer 100, or portions thereof, may be stored in the remote memory storage device. It will be appreciated that the network connections shown are exemplary and other means of establishing a communications link between the computers may be used.

Overview of Components and Operation

Figure 2:
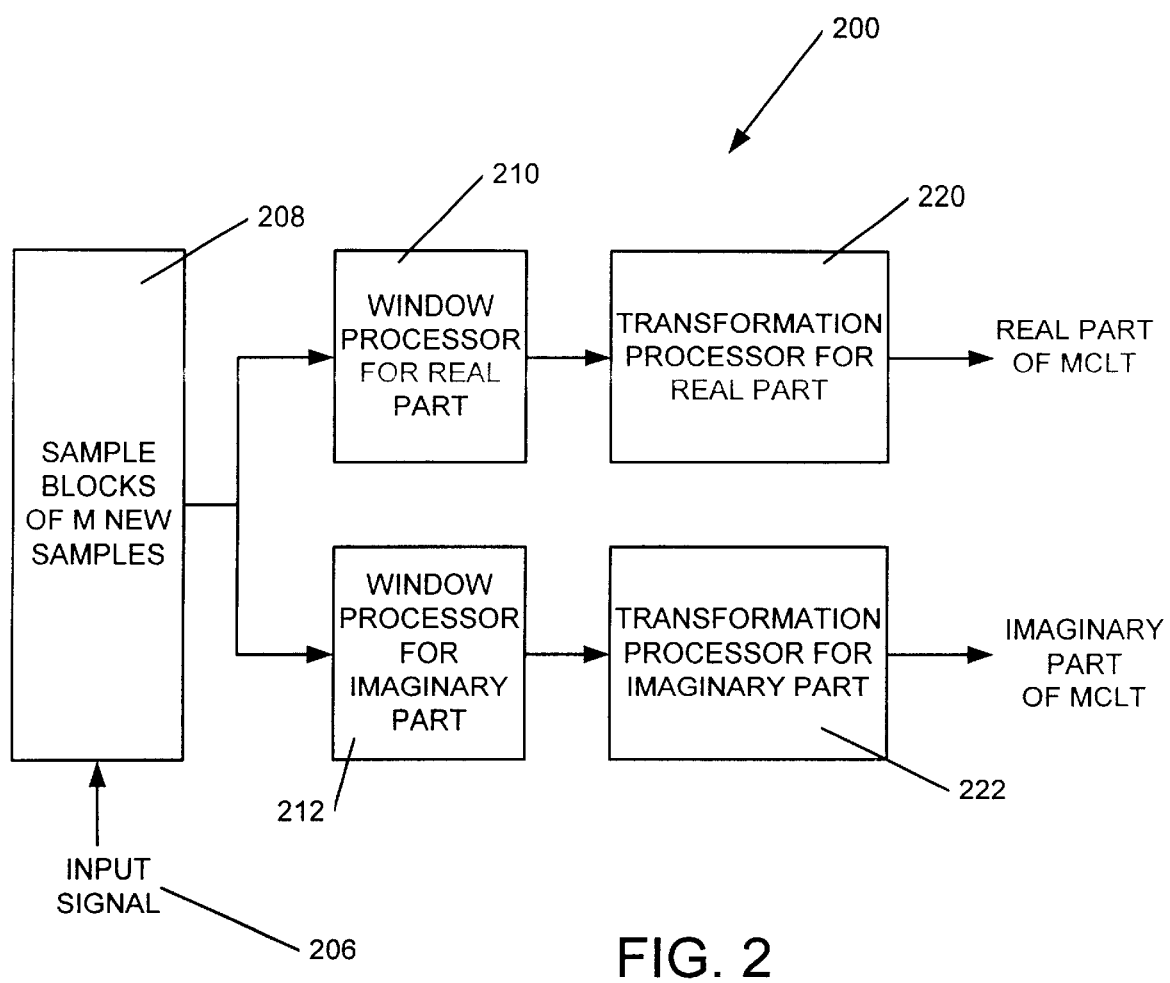
FIG. 2 is a general block diagram illustrating a system for computing and encoding modulated complex lapped transforms in accordance with the present invention.

FIG. 2 is a general block diagram illustrating a system for computing and encoding modulated complex lapped transforms in accordance with the present invention. In the system 200 of the present invention, an input signal 206 is received by a sampling device 208, which breaks the signal into blocks. Each block contains L samples, and each new block is formed by discarding the M oldest samples of the block and adding the M newest input samples to the block. In a typical implementation, L=2M. Also included in the system 200 are real and imaginary window processors 210, 212 for reducing blocking effects, and real and imaginary transformation processors 220, 222 for coding each block. It should be noted that one window processor with dual real and imaginary computational devices can be used instead of separate real and imaginary window processors. Similarly, one transform processor with dual real and imaginary computational devices can be used instead of separate real and imaginary transform processors.

The real and imaginary window processors 210, 212 receive and process the input block by applying and computing butterfly coefficients for the real and imaginary parts of the signal, respectively, to produce resulting real and imaginary vectors. The butterfly coefficients are determined by a given window function, which will be discussed in detail below. The real and imaginary transformation processors 220, 222 compute spatial transforms on the resulting real and imaginary vectors to produce real and imaginary transform coefficients of the MCLT, respectively.

Figure 3:
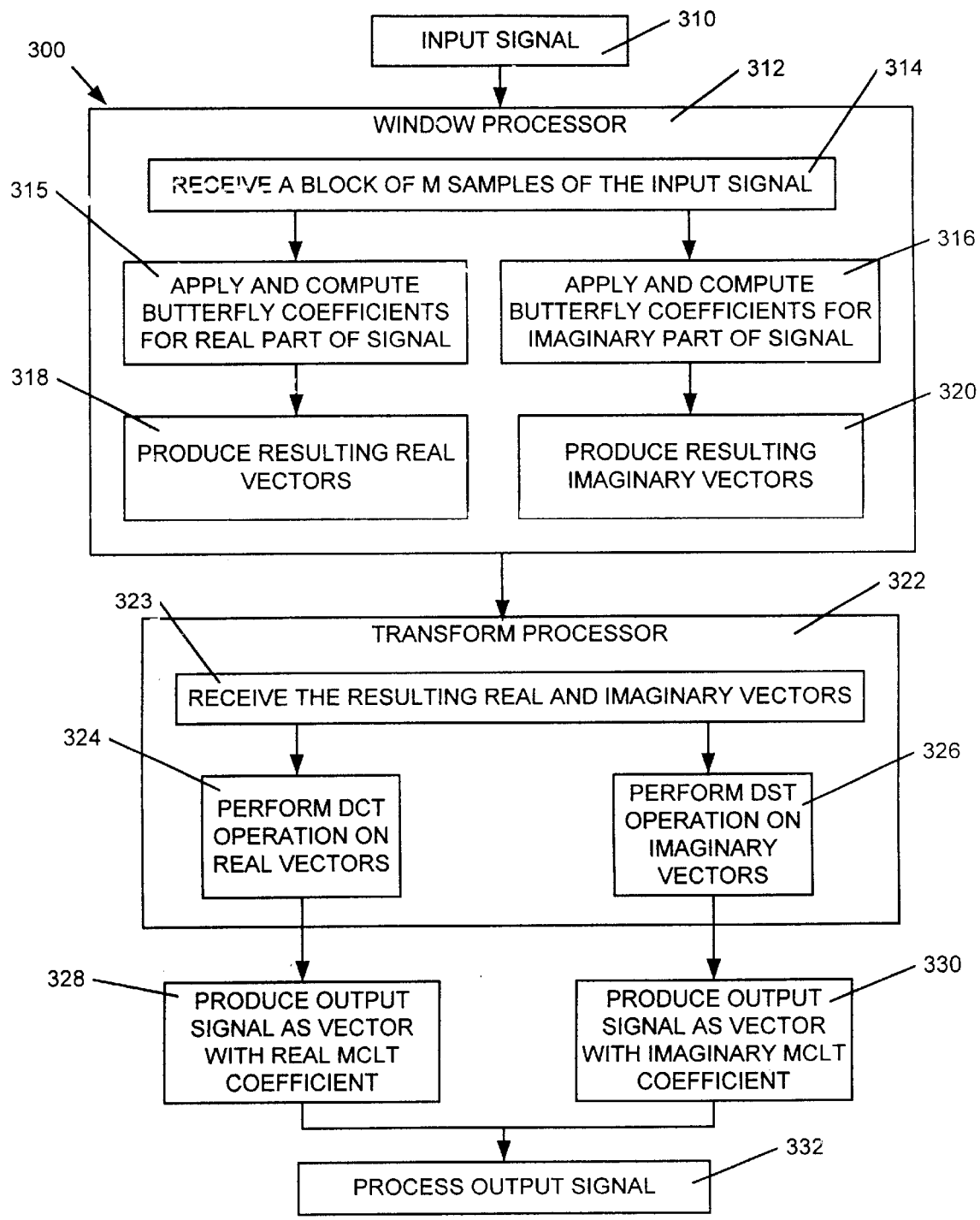
FIG. 3 is a general block/flow diagram illustrating a system and method for computing modulated lapped transforms in accordance with the present invention.

FIG. 3 is a general block/flow diagram illustrating a system and method for computing modulated lapped transforms in accordance with the present invention. In general, the MCLT computation system 300 first receives an input signal 310. Second, a single window processor 312 with real and imaginary computational devices or dual real and imaginary window processors receives a block of M samples of the input signal (box 314). The window processor 312 applies and computes butterfly coefficients, for the real and imaginary parts of the signal (boxes 315, 316), respectively, to produce real and imaginary resulting vectors (boxes 318, 320), respectively.

Third, a single transform processor 322 with real and imaginary computational devices or dual real and imaginary transform processors receives the real and imaginary resulting vectors (box 323). The transform processor 318 performs a discrete cosine transform (DCT) operation on the real vectors (box 324) and a discrete sine transform (DST) operation on the imaginary vectors (box 326). Fourth, real and imaginary output signals are respectively produced as vectors with real and imaginary MCLT coefficients corresponding to the input block of samples (boxes 328, 330). Fifth, the output signal can be processed by transmitting, storing, enhancing, filtering, etc. the signal (box 332). For example, interference within the signal can be reduced with a noise reducer, echo canceller, etc., compression can be achieved by scalar or vector quantization of the MLT coefficients, etc., as desired.

Structural and Operational Details of the System

Figure 4:
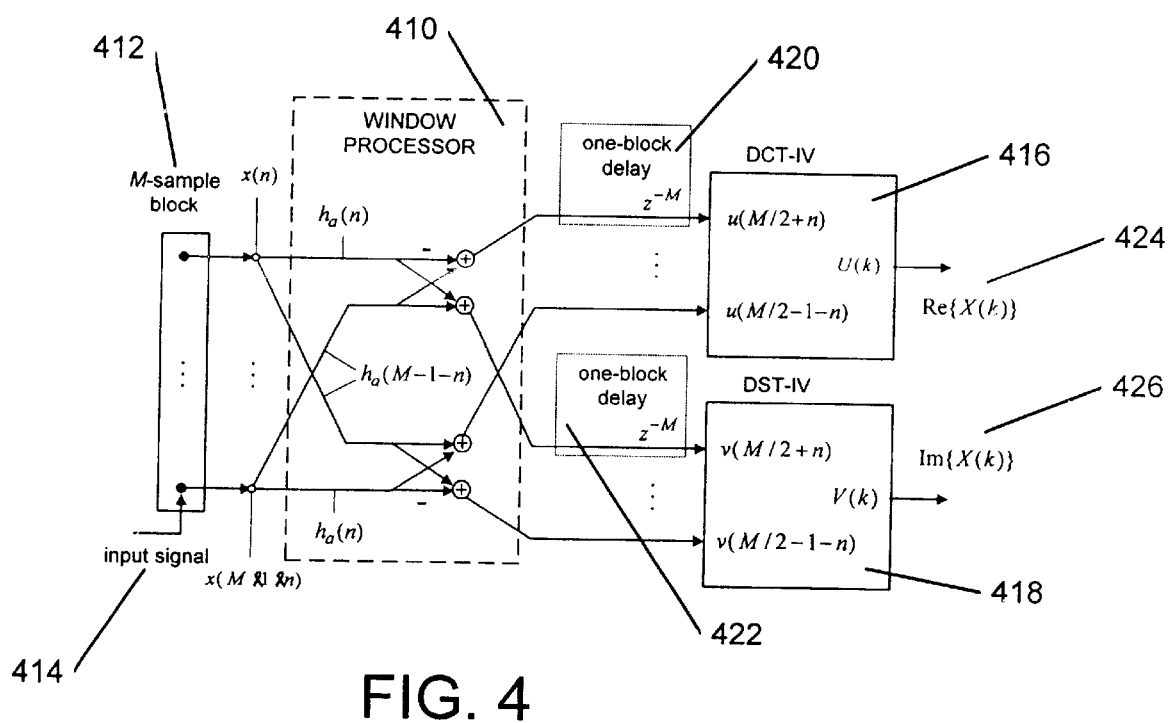
FIG. 4 is a detailed block/flow diagram illustrating computation of a modulated complex lapped transform in accordance with the present invention.

FIG. 4 is a detailed block/flow diagram illustrating a modulated complex lapped transform (MCLT) extended from a modulated lapped transform processor (MLT) in accordance with the present invention. Referring back to FIGS. 2–3 along with FIG. 4, the incoming signal is decomposed into frequency components by a transform processor, such as a modulated complex lapped transform processor (MCLT) of the present invention, that is preferably an extension of a modulated lapped transform processor (MLT). An MLT is preferably the basis for the MCLT because among other things, although other transform processors, such as discrete cosine transforms (DCT and DCT-IV) are useful tools for frequency-domain signal decomposition, they suffer from blocking artifacts. For example, transform coefficients X(k) are processed by DCT and DCT-IV transform processors in some desired way, such as quantization, filtering, noise reduction, etc.

Reconstructed signal blocks are obtained by applying the inverse transform to such modified coefficients. When such reconstructed signal blocks are pasted together to form the reconstructed signal (e.g. a decoded audio or video signal), there will be discontinuities at the block boundaries. In contrast, the modulated lapped transform (MLT) eliminates such discontinuities by extending the length of the basis functions to twice the block size, i.e. 2M.

The basis functions of the MLT are obtained by extending the DCT-IV functions and multiplying them by an appropriate window, in the form:

$$a_{nk} = h(n)\cos\left[\left(n + \frac{M+1}{2}\right)\left(k + \frac{1}{2}\right)\frac{\pi}{M}\right]$$

where k varies from 0 to M−1, but n now varies from 0 to 2M−1.

Thus, the MLT can lead to orthogonal or biorthogonal basis and can achieve short-time decomposition of signals as a superposition of overlapping windowed cosine and sine functions. Such functions provide a more efficient tool for localized frequency decomposition of signals than the DCT or DCT-IV. The MLT is a particular form of a cosine-modulated filter bank that allows for perfect reconstruction. For example, a signal can be recovered exactly from its MLT coefficients. Also, the MLT does not have blocking artifacts, namely, the MLT provides a reconstructed signal that decays smoothly to zero at its boundaries, avoiding discontinuities along block boundaries. In addition, the MLT has almost optimal performance, in a rate/distortion sense, for transform coding of a wide variety of signals.

Specifically, the MLT is based on the oddly-stacked time-domain aliasing cancellation (TDAC) filter bank. In general, the standard MLT transformation for a vector containing 2M samples of an input signal x(n), n=0, 1, 2, . . . , 2M−1 (which are determined by shifting in the latest M samples of the input signal, and combining them with the previously acquired M samples), is transformed into another vector containing M coefficients X(k), k=0, 1, 2, . . . , M−1. The transformation can be redefined by a standard MLT computation:

$$X(k) \equiv \sqrt{\frac{2}{M}} \sum_{n=0}^{2M-1} x(n)h(n)\cos\left[\left(n + \frac{M+1}{2}\right)\left(k + \frac{1}{2}\right)\frac{\pi}{M}\right]$$

where h(n) is the MLT window.

Window functions are primarily employed for reducing blocking effects. For example, *Signal Processing with Lapped Transforms,* by H. S. Malvar, Boston: Artech House, 1992, which is herein incorporated by reference, demonstrates obtaining its basis functions by cosine modulation of smooth window operators, in the form:

$$p_a(n, k) = h_a(n)\sqrt{\frac{2}{M}} \cos\left[\left(n + \frac{M+1}{2}\right)\left(k + \frac{1}{2}\right)\frac{\pi}{M}\right] \quad (1)$$

$$p_s(n, k) = h_s(n)\sqrt{\frac{2}{M}} \cos\left[\left(n + \frac{M+1}{2}\right)\left(k + \frac{1}{2}\right)\frac{\pi}{M}\right]$$

where $P_a(n,k)$ and $P_s(n,k)$ are the basis functions for the direct (analysis) and inverse (synthesis) transforms, and $h_a(n)$ and $h_s(n)$ are the analysis and synthesis windows, respectively. The time index n varies from 0 to 2M−1 and the frequency index k varies from 0 to M−1, where M is the block size. The MLT is the TDAC for which the windows generate a lapped transform with maximum DC concentration, that is:

$$h_a(n) = h_s(n) = \sin\left[\left(n + \frac{1}{2}\right)\frac{\pi}{2M}\right] \quad (2)$$

The direct transform matrix $P_a$ has an entry in the n-th row and k-th column of $P_a(n,k)$. Similarly, the inverse transform matrix $P_s$ has entries $P_s(n,k)$. For a block x of 2M input samples of a signal x(n), its corresponding vector X of transform coefficients is computed by $X=P_u^T x$ For a vector Y of processed transform coefficients, the reconstructed 2M-sample vector y is given by $y=P_s Y$. Reconstructed y vectors are superimposed with M-sample overlap, generating the reconstructed signal y(n).

The MLT can be compared with the DCT-IV. For a signal u(n), its length-M orthogonal DCT-IV is defined by:

$$U(k) \equiv \sqrt{\frac{2}{M}} \sum_{n=0}^{M-1} u(n)\cos\left[\left(n + \frac{1}{2}\right)\left(k + \frac{1}{2}\right)\frac{\pi}{M}\right]$$

The frequencies of the cosine functions that form the DCT-IV basis are (k+1/2)π/M, the same as those of the MLT.

Therefore, a simple relationship between the two transforms exists. For instance, for a signal x(n) with MLT coefficients X(k), it can be shown that X(k)=U(k) if u(n) is related to x(n), for n=0, 1, ..., M/2−1, by:

$$u(n+M/2)=\Delta_M\{x(M-1-n)h_a(M-1-n)-x(n)h_a(n)\}$$

$$u(M/2-1-n)=x(M-1-n)h_a(n)+x(n)h_a(M-1-n)$$

where $\Delta_M\{\cdot\}$ is the M-sample (one block) delay operator. For illustrative purposes, by combining a DCT-IV with the above, the MLT can be computed from a standard DCT-IV. An inverse MLT can be obtained in a similar way. For example, if Y(k)=X(k), i.e., without any modification of the transform coefficients (or subband signals), then cascading the direct and inverse MLT processed signals leads to y(n)=x(n−2M), where M samples of delay come from the blocking operators and another M samples come from the internal overlapping operators of the MLT (the $z^{-M}$ operators).

Assuming symmetrical analysis and synthesis windows, i.e. $h_a(n)=h_a(2M-1-n)$ and $h_s(n)=h_s(2M-1-n)$, it is easy to verify that perfect reconstruction is obtained with:

$$h_a(n) = \frac{h_s(n)}{h_s^2(n) + h_s^2(M-1-n)} \quad (3)$$

Consider the product window $h_p(n)=h_a(n)h_s(n)$ From eqn. (3), it follows that:

$$h_p(n)+h_p(n+M)=h_p(n)+h_p(M-1-n)=1 \quad (4)$$

With either the MLT window in (2) or the biorthogonal windows, the product window satisfies:

$$h_p(n) = \sin^2\left[\left(n+\frac{1}{2}\right)\frac{\pi}{2M}\right] = \frac{1}{2} - \frac{1}{2}\cos\left[\left(n+\frac{1}{2}\right)\frac{\pi}{M}\right] \quad (5)$$

In accordance with the present, a modulated complex lapped transform (MCLT) is derived. The basis functions of the MCLT are defined by cosine and sine modulation of the analysis and synthesis windows, in the form:

$$p_a(n,k) = p_a^c(n,k) - jp_a^s(n,k) \quad (6)$$

$$p_a^c(n,k) = h_a(n)\sqrt{\frac{2}{M}}\cos\left[\left(n+\frac{M+1}{2}\right)\left(k+\frac{1}{2}\right)\frac{\pi}{M}\right]$$

$$p_a^s(n,k) = h_a(n)\sqrt{\frac{2}{M}}\sin\left[\left(n+\frac{M+1}{2}\right)\left(k+\frac{1}{2}\right)\frac{\pi}{M}\right]$$

with $j=\sqrt{-1}$, and $$p_s(n,k) = \frac{1}{2}[p_s^c(n,k) + jp_s^s(n,k)] \quad (7)$$

$$p_s^c(n,k) = h_s(n)\sqrt{\frac{2}{M}}\cos\left[\left(n+\frac{M+1}{2}\right)\left(k+\frac{1}{2}\right)\frac{\pi}{M}\right]$$

$$p_s^s(n,k) = h_s(n)\sqrt{\frac{2}{M}}\sin\left[\left(n+\frac{M+1}{2}\right)\left(k+\frac{1}{2}\right)\frac{\pi}{M}\right]$$

The MCLT transform coefficients X(k) are computed from the input signal block x(n) by $X=P_a^T x$, or $$X(k) = \sum_{n=0}^{2M-1} x(n)p_a(n,k) \quad (8)$$

Comparing (1) and (6), it is clear that the MLT of a signal is given by the real part of its MCLT.

Construction of the MCLT can be viewed as providing additional sine-modulated functions as a 2× oversampling in the frequency domain, because for every new M real-valued input samples the MCLT computes M complex frequency components. In addition, the MCLT functions above form an over-complete basis. Consequently, the MCLT is in fact a 2× oversampled DFT filter bank (using a doubly-odd DFT instead of the traditional DFT), in which the DFT length size is 2M and the frame (block) size is M. It should be noted that, unlike in DFT filter banks, the lowest-frequency subband (the "DC" subband) is complex-valued. With the MCLT, if the direct and inverse transforms are cascaded for a block, without modifying the transform coefficients, the following is obtained:

$$X=P_a^T x, \; Y=X, \; y=P_s Y \Rightarrow y=P_s P_a^T x \quad (9)$$

with $$P_s P_a^T = diag\{h_p(n)\} \quad (10)$$

Thus, it should be noted that the mapping from the input block x to the reconstructed block y is done via a diagonal matrix of order 2M. This is in n contrast to the MLT, for which the product $P_s P_a^T$ is not diagonal. In fact, the off-diagonal terms of $P_s P_a^T$ for the MLT are the time-domain aliasing terms, which are cancelled when the overlapped blocks are superimposed. When the subband signals are processed such that Y≠X, then the time-domain aliasing terms will not cancel exactly, producing artifacts. The MCLT, because of its 2× oversampling, does not rely on time-domain aliasing cancellation.

Moreover, another property of the MCLT is that the reconstruction formula:

$$y(n) = \sum_{k=0}^{M-1} Y(k)p_s(n,k) \quad (11)$$

is achieved. Perfect reconstruction (with X(k)=Y(k), of course) can also be achieved with the choices:

$$y_c(n) = \sum_{k=0}^{M-1} \text{Re}\{Y(k)\}p_s^c(n,k) \quad \text{or} \quad (12)$$

$$y_s(n) = \sum_{k=0}^{M-1} \text{Im}\{Y(k)\}p_s^s(n,k) \quad (13)$$

In eqn. (12), an inverse MLT is recognized. Although y(n), $y_c(n)$, and $y_s(n)$ in eqns. (11)—(13) are not block-by-block identical, they build exactly the same reconstructed signal after overlapping.

The magnitude frequency responses of the MCLT filter bank are the same as those of the MLT. For each frequency $\omega_k=(k+1/2)\pi/M$ there are two subbands with the same magnitude frequency response but $\pi/2$ radians out of phase. As such, there is significant overlap among the frequency responses of neighboring subbands, and the stopband attenuation is around −22 dB with the sine window in eqn. (2).

Fast Computation

As with the MLT, the MCLT can be computed via the type-IV discrete cosine transform (DCT-IV). For a signal u(n), its length-M orthogonal DCT-IV is defined by:

$$U(k) \equiv \sqrt{\frac{2}{M}} \sum_{n=0}^{M-1} u(n)\cos\left[\left(n+\frac{1}{2}\right)\left(k+\frac{1}{2}\right)\frac{\pi}{M}\right] \quad (14)$$

The frequencies of the cosine functions that form the DCT-IV basis are $(k+1/2)\pi/M$, the same as those of the MLT and MCLT. The type-IV discrete sine transform (DST-IV) of a signal v(n) is defined by.

$$V(k) \equiv \sqrt{\frac{2}{M}} \sum_{n=0}^{M-1} v(n)\sin\left[\left(n+\frac{1}{2}\right)\left(k+\frac{1}{2}\right)\frac{\pi}{M}\right] \quad (15)$$

For a signal x(n) with MCLT coefficients X(k) determined by eqn. (8), Re{X(k)}=U(k) and Im{X(k)}=V(k), if u(n) in eqn. (14) is related to x(n), for n=0, 1, ..., M/2−1, by:

$u(n+M/2)=\Delta_M\{x(M-1-n)h_a(M-1-n)-x(n)h_a(n)\}$ $u(M/2-1-n)=x(M1-n)h_a(n)+x(n)h_a(M-1-n)$ and v(n) in (15) is related to x(n) by $v(n+M/2)=\Delta_M\{x(M-1-n)h_a(M-1-n)+x(n)h_a(n)\}$ $v(M/2-1-n)=-x(M-1-n)h_a(n)+x(n)h_a(M-1-n)$ where $\Delta_M\{\cdot\}$ is the M-sample (one block) delay operator.

Thus, the MCLT can be computed from a MCLT computational system 400 having a window processor 410, which receives M sample blocks 412 of an input signal 414. The window processor 410 has real and imaginary window operators, real and imaginary transform processors 416, 418, such as a length-M DCT-IV and a length-M DST-IV, respectively, as shown in the simplified block diagram of FIG. 4. The real and imaginary window operators of the window processor 410 applies and computes real and imaginary butterfly coefficients, respectively to produce resulting real and imaginary vectors.

After a predefined delay of the real and imaginary vectors, such as a one-block delay, from a real delay block 420 and an imaginary delay block 422, respectively, the length-M DCT-IV 416 receives the real vectors and the length-M DST-IV 418 receives the imaginary vectors. The real transform processor 416 performs a discrete cosine transform (DCT) operation on the real vectors and the imaginary transform processor 418 performs a discrete sine transform (DST) operation on the imaginary vectors. Output signals with real and imaginary parts 424, 426 are produced as vectors with MCLT coefficients corresponding to the input block of samples.

As shown in FIG. 4, for the fast direct MCLT, n=0, 1, ..., M/2−1, k=0, 1, ..., M/2−1. The DCT-IV and DST-IV can be implemented with the fast techniques. The inverse MCLT can be computed by simply transposing the components, moving the delays to the bottom half ouputs of the DCT-IV and DST-IV, replacing the coefficients $h_a(n)$ by $h_s(n)$, and multiplying the contents of the final buffer by ½. The fast MCLT computation shown in FIG. 4 does not assume identical analysis and synthesis windows. Therefore, it can be used to compute a biorthogonal MCLT, as long as the windows satisfy the perfect reconstruction condition in eqn. (3).

Figure 5A:
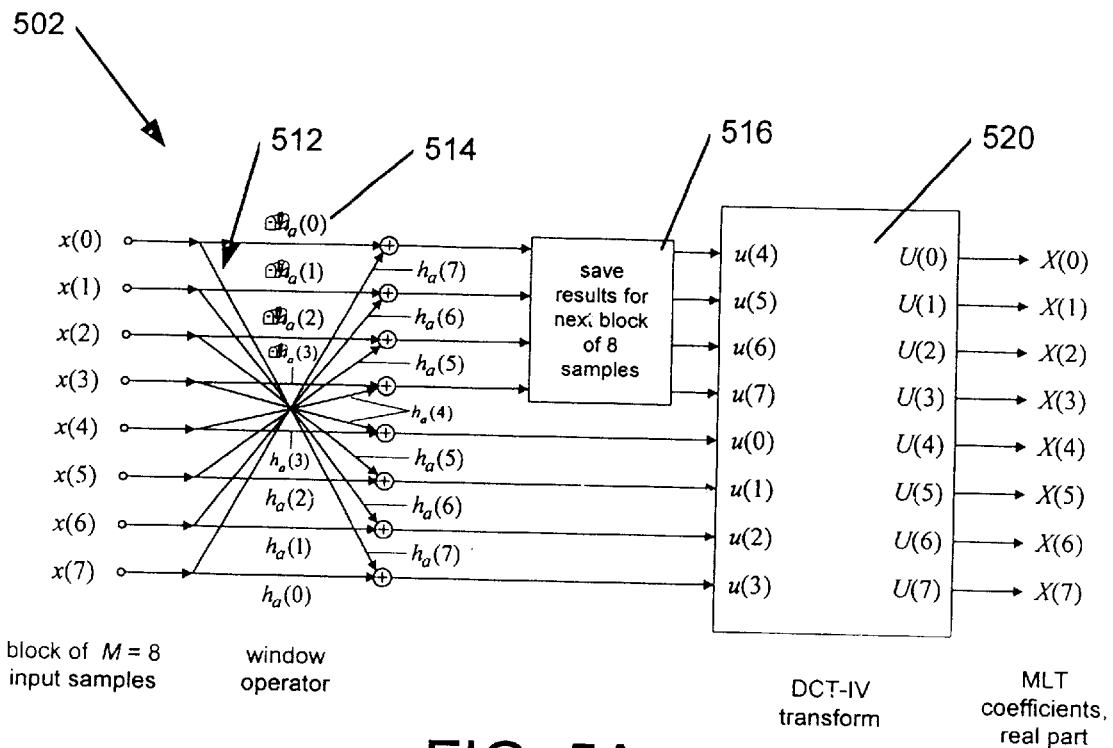
FIG. 5 is a detailed diagram illustrating the window operation of the modulated complex lapped transform of FIG. 4.
Figure 5B:
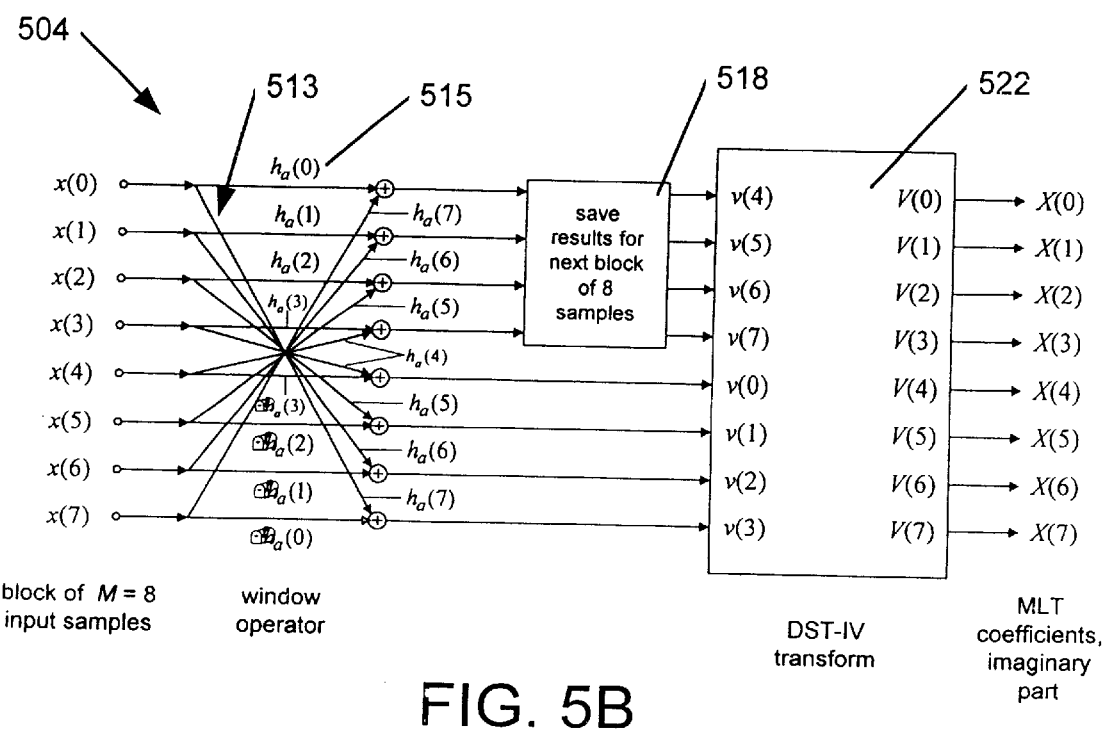

FIGS. 5A and 5B are detailed diagrams illustrating the window operation of the modulated complex lapped transform of FIG. 4 for the case M=8. It is easy to infer from those diagrams the general structure for any choice of the block size M. In general, as shown in FIGS. 5A and 5B, the MCLT computational system 400 of FIG. 4 includes real and imaginary window operators 502, 504. Initially, a first a block of M samples of an input signal x(n) is obtained. Second, for each window operator 502, 504 butterfly coefficients 512, 513 are applied and computed to produce resulting real vectors u(n) and imaginary vectors v(n). The butterfly coefficients are determined by a window function {h(n)} 514, 515.

For each window operator 502, 504 half of the resulting vectors are stored in a buffer of a one block delay 516, 518 to be used for the next block, while the current contents of the buffer are recovered. Next, the real and imaginary vectors are received by the real and imaginary transform processors 520, 522, which are preferably discrete cosine transform (DCT) and discrete sine transform (DST) processors to produce vectors with real and imaginary MCLT transform coefficients corresponding to the input signal.

Working Operational Example

Figure 6:
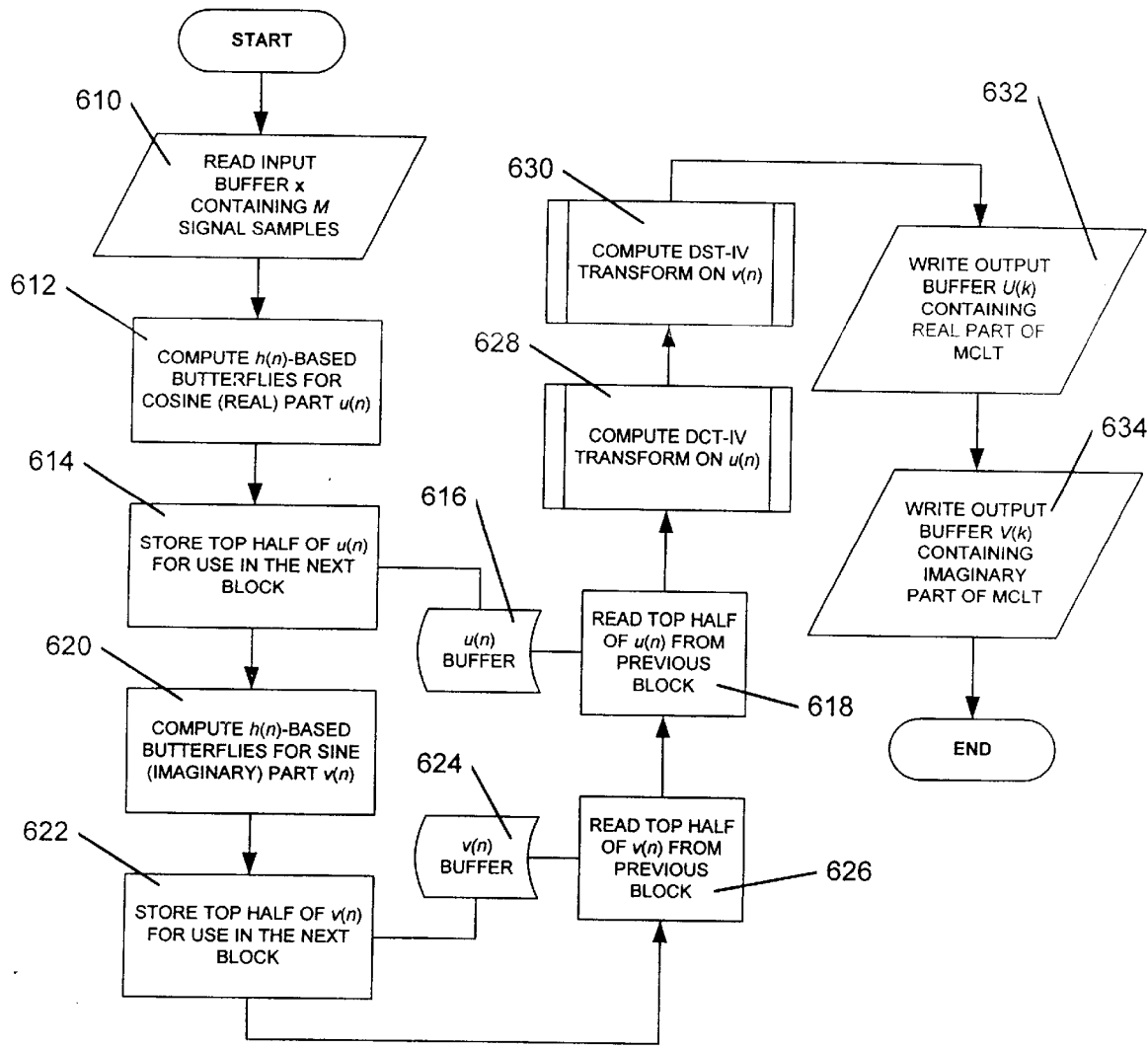
FIG. 6 is a flow diagram illustrating operational computation of a modulated complex lapped transform in accordance with the present invention.

FIG. 6 is a flow diagram illustrating operational computation of a working example of a modulated complex lapped transform in accordance with the present invention. Referring to FIGS. 3, 4, 5A and 5B along with FIG. 6, first, an input buffer x containing M signal samples are read by a MCLT system (box 610). Second, h(n) based butterflies are computed for a cosine (real) part u(n) (box 612), a top half of u(n) is stored in a buffer 616 for use in the next block (box 614) and the top half of u(n) is read from a previous block (box 618). Next, h(n) based butterflies are computed for a sine (imaginary) part v(n) (box 620), a top half of v(n) is stored in a buffer 624 for use in the next block (box 622) and the top half of v(n) is read from a previous block (box 626). A discrete cosine transform, type IV (DCT IV) is then computed on u(n) (box 628) and a discrete sine transform, type IV (DST IV) is computed on v(n) (box 630). Last, an output buffer U(k) containing the real part of the MCLT is produced (box 632) and an output buffer V(k) containing the imaginary part of the MCLT is produced (box 634).

This allows the present invention to provide perfect reconstruction, in that a signal x(n) (where n denotes the discrete-time index) can be recovered exactly from its MCLT coefficients. The MCLT is a linear operator that projects the input block into a frame containing 2M basis functions. The MCLT corresponds to a tight frame (all blocks of same energy are mapped into transform vectors with the same energy), with a magnitude amplification factor equal to two.

An advantage of the novel MCLT of the present invention is that the MCLT maps a block of M input signal samples into M complex frequency coefficients. As a result, magnitude and phase information at each frequency is immediately available with the MCLT. In addition, the real part of the MCLT is the MLT, which makes for simplified computation of the MLT of a signal whose MCLT is known. This allows for efficient integration with multimedia applications, such as acoustic echo cancellation and audio coding. Moreover, because the MCLT maps a block of M input signal samples into M complex frequency coefficients, the MCLT leads to data expansion of a factor of two. In other words, an oversampling factor of two. This oversampling actually provides good performance in acoustic echo cancellation applications.

In summary, the MCLT of the present invention provides short-time spectral decomposition of signals with explicit magnitude and phase information and perfect signal reconstruction. Fast computability by means of butterflies followed by discrete cosine transform operators. Also, the real of the MCLT can be computed directly by the techniques discussed above, and the imaginary part can be computed with simple modifications. In addition, the MCLT is easily integrated with MLT-based systems. Further, once the MCLT of a signal has been computed, its MLT can be trivially obtained simply by discarding the imaginary part.

MCLT Used as an Adaptive Filter

General Overview

Figure 7:
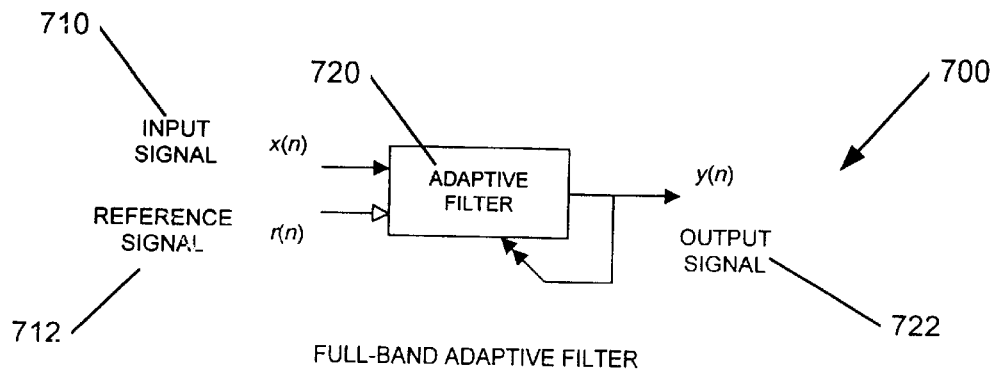
FIG. 7 is a general block diagram of a full-band adaptive filter.

FIG. 7 is a general block diagram of a full-band adaptive filter using an adaptive FIR filtering approach. In general, a filtering system 700, such as a full-band adaptive filtering system, includes an input signal x(n) 710 and reference signal r(n) 712 received by an adaptive filter 720. The adaptive filter produces an output signal y(n) 722, which is sent back into the adaptive filter 720 for providing automatic refinement adjustments to the filtering process until the output signal y(n) approximates as closely as possible the reference signal r(n).

Specifically, the adaptive filter is preferably a filter with time-varying coefficients, which are automatically adjusted such that the output of the filter approximates as closely as possible a prescribed reference signal. If the adaptive filter has a finite impulse response (FIR), the output signal y(n) is computed from the input signal x(n) by $$y(n) = \sum_{l=0}^{L-1} w_l(n)x(n-l)$$

where L is the length of the filter and $\{w_l(n), l=0, 1, \ldots, L-1\}$ are the time-varying filter coefficients. The adaptive filter allows the output y(n) to approximate a reference signal r(n), or equivalently, drives the error signal e(n)=r(n)−y(n) as close to zero as possible.

Given an initial setting for the filter coefficient vector $w_l(0)$ the coefficients can be updated by using a LMS update equation:

$$w_l(n+1)=w_l(n)+2\mu e(n)x(n-l)$$

where $\mu$ is a parameter that controls the speed of adaptation. For any coefficient position l, the LMS performs updates as an adaptation rule if the error e(n) has the same sign as the input e(n), i.e. if their product is positive, then |y(n)| is too small, and thus $w_l$ should be increased. The adaptation rule above corresponds to adjusting the coefficient vector w in the negative direction of the gradient of the error with respect to w, i.e. a steepest descent update.

Figure 8:
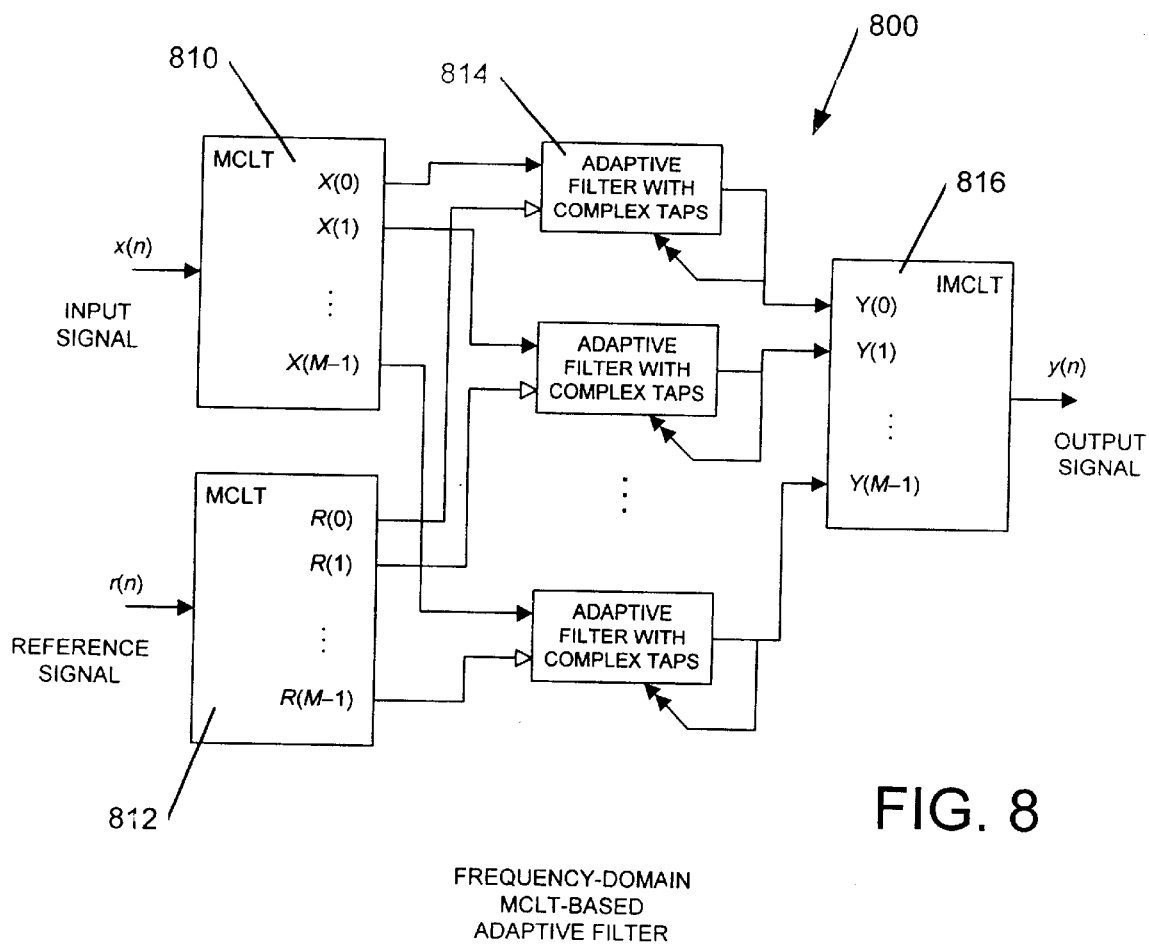
FIG. 8 is a general block diagram of a frequency-domain MCLT-based adaptive filter in accordance with the present invention.

The adaptive filter of FIG. 7 can be used in many applications where the response of the filter needs to change in view of varying conditions. Examples include modems (to equalize the signal distortions caused by the telephone lines) and acoustic echo cancellers (to remove the feedback from loudspeakers into microphones). If the input signal has a frequency spectrum that contains many peaks and valleys (i.e., if it is heavily colored), the parameter $\mu$ in the LMS update equation has to be set to a very low value, which reduces the speed of adaptation, i.e., the speed in which the error signal e(n) converges to values near zero. On the other hand, if the input signal has a flat (white) spectrum, the LMS update equation is optimal, in the sense that it will lead to the fastest possible convergence Frequency-Domain Adaptive Filters FIG. 8 is a general block diagram of a frequency-domain MCLT-based adaptive filter in accordance with the present invention. The performance of the LMS adaptive filter of FIG. 7 discussed above can be improved for colored input signals by using the new structure in FIG. 8. For instance, the signals can be broken into frequency subbands and an adaptive LMS filter can be performed in each subband, as shown in FIG. 8. Although FIG. 8 depicts the MCLT as the transform operator that performs the frequency decomposition, other transforms could be used, such as a modulated lapped transform (MLT). If real transforms such as the MLT are used, the adaptive filters of each of the subbands have real coefficients. With a complex-valued transform such as the MCLT, the filter coefficients will have complex values.

In general, the frequency-domain adaptive filter of FIG. 8 includes a first MCLT processor 810 for receiving and processing an input signal x(n) for producing input signal vectors, such as X(0) through X(M−1) and a second MCLT processor 812 for receiving and processing a reference signal r(n) for producing reference signal vectors, such as R(0) through R(M−1). Also included in system 800 are plural adaptive filters 814 for receiving the input signal vectors X(0) through X(M−1) and the reference signal vectors R(0) through R(M−1) for producing corrected signal vectors, such as Y(0) through Y(M−1) and an inverse modulated complex lapped transform processor (IMCLT) 816. The IMCLT 816 receives and processes the corrected signal vectors Y(0) through Y(M−1) for producing a final output signal y(n) that substantially matches the input signal x(n).

Thus, in the frequency-domain the adaptive filter of FIG. 8, there is an adaptive filter for each subband k. Consequently, the subband signals are modified according to the adaptive filter learning computation. The final output y(n) is obtained by applying an inverse MCLT (IMCLT) on the corrected subband/transform coefficients {Y(k)}. If the original adaptive filter of FIG. 7 had L coefficients, each adaptive filter in FIG. 8 needs only to have L/M coefficients, for the same time span.

The advantages of using the frequency-domain adaptive filter of FIG. 8 include faster convergence, because the signals within each subband are approximately white, even for a heavily colored input. Also, the device of FIG. 8 provides improved error control, because the $\mu$ factors for the adaptive filters in each subband can be adjusted independently. Finally, the system in FIG. 8 can have a reduced computational complexity, because of the fast FFT-based algorithms available to compute the transforms.

Acoustic Echo Cancellation (AEC)

One application of the adaptive filter of FIG. 8 is in acoustic echo cancellation (AEC), such as for real-time full-duplex communication systems (for instance, speakerphones and videoconference systems). For instance, in a speakerphone system, the AEC can use an adaptive filter that estimates the feedback transfer function from the loudspeaker to the microphone. The estimated echo return is then subtracted from the microphone signal. Simple FIR filters are not ideal because of the length of the impulse response necessary to obtain a reasonable amount of echo reduction (for a 16 kHz sampling rate and an echo window of 100 ms, a 1,600-point impulse response is needed). With subband adaptive filtering, the long FIR full-band filter is replaced by a collection of short FIR filters, one for each subband.

A critically sampled filter bank such as the MLT can be used for adaptive filtering, but the uncancelled aliasing due to subband processing may limit the amount of echo reduction to 10 dB or less. Performance can be improved by using cross-filters among neighboring subbands, but the extra degrees of freedom in such adaptive cross-filters usually slows down convergence significantly. With the MLCT, subband acoustic echo cancellation (AEC) can be performed without cross-filters. Each subband can be processed by a short FIR filter with complex taps, as shown in FIG. 8. With a large number of subbands, the subband signals are essentially white, and so each adaptive filter can be adjusted via the normalized LMS computation.

Figure 9:
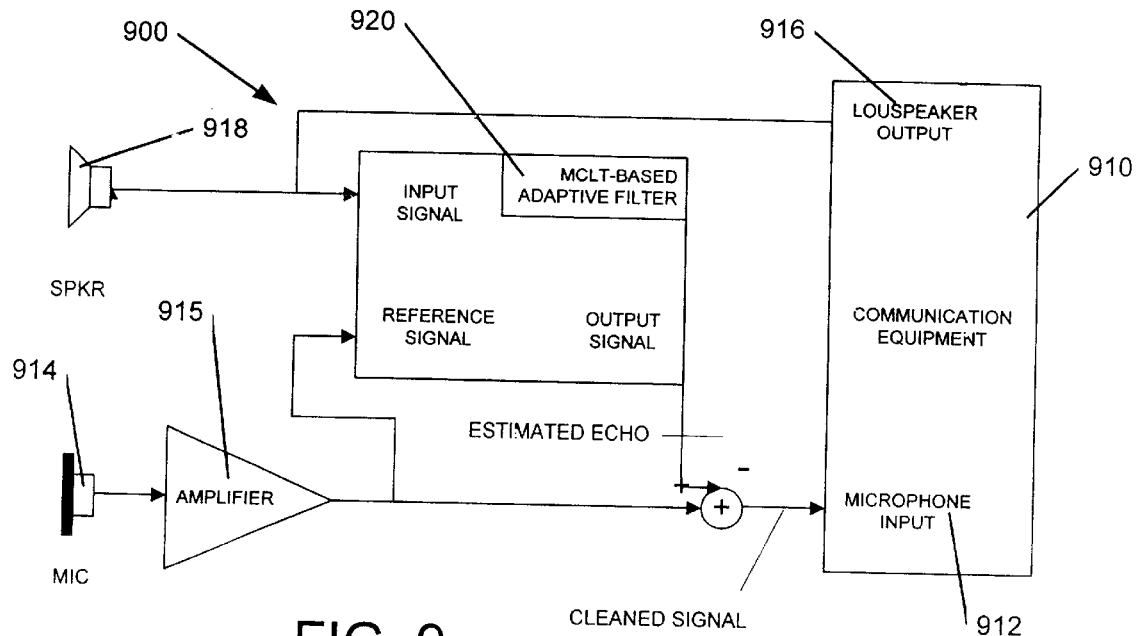
FIG. 9 is a block diagram of a working example of the adaptive filer of FIG. 8 of the present invention in the form of an acoustic echo cancellation device.

FIG. 9 is a block diagram of a speakerphone working example of the adaptive filer of FIG. 8 of the present invention in the form of an acoustic echo cancellation device. The speakerphone system 900 of FIG. 9 includes communication equipment 910 comprising microphone input signals 912 received from a microphone 914, which can be amplified by an amplifier 915 and speaker output signals 916 transmitted to a speaker 918. The system 900 also includes a filter 920, such as the MCLT-based adaptive filter discussed above, for receiving input signals produced by the speaker 918 and reference signals received by the microphone 914.

For example, in typical speakerphone systems, the local microphone not only captures audio signals intended to be transmitted (such as voice signals of a local person), it also captures audio signals that are being attenuated at the local loudspeaker (such as voice signals from a remote person's transmission) as feedback. Unless the speaker feedback is cancelled, that feedback signal is sent back to the remote person. As such, the remote person will hear an echo of his or her own voice transmitted to the local person.

To solve this problem, the adaptive filter of the present invention includes an MCLT-based adaptive filter for processing and filtering the input and references signal for producing an output signal with information indicating the estimated echo portion of the signal. The estimated echo portion of the output signal is removed or canceled and a resulting clean output signal is sent to the microphone input of the communication equipment 910. Consequently, after an initial audio signal is sent through the system 900, subsequent audio signals with feedback or echoes produced by the loudspeaker 918 are canceled by the adaptive filter 920 before the microphone input is received Since the input to the adaptive filter 920 is the signal from the speaker 918 and the reference input is the signal from the microphone 914, the output of the adaptive filter will be a good estimate of the portion of the microphone signal that is dependent on the loudspeaker signal, which is precisely the echo. When the echo is subtracted from the signal of the microphone 914, as shown in FIG. 9, only the part of the microphone signal that is not correlated with the loudspeaker signal will remain. The remaining part (which is the "cleaned" microphone signal 912 in FIG. 9) corresponds to the other local sounds, such as the voice of the person speaking and other ambient sounds.

Figure 10:
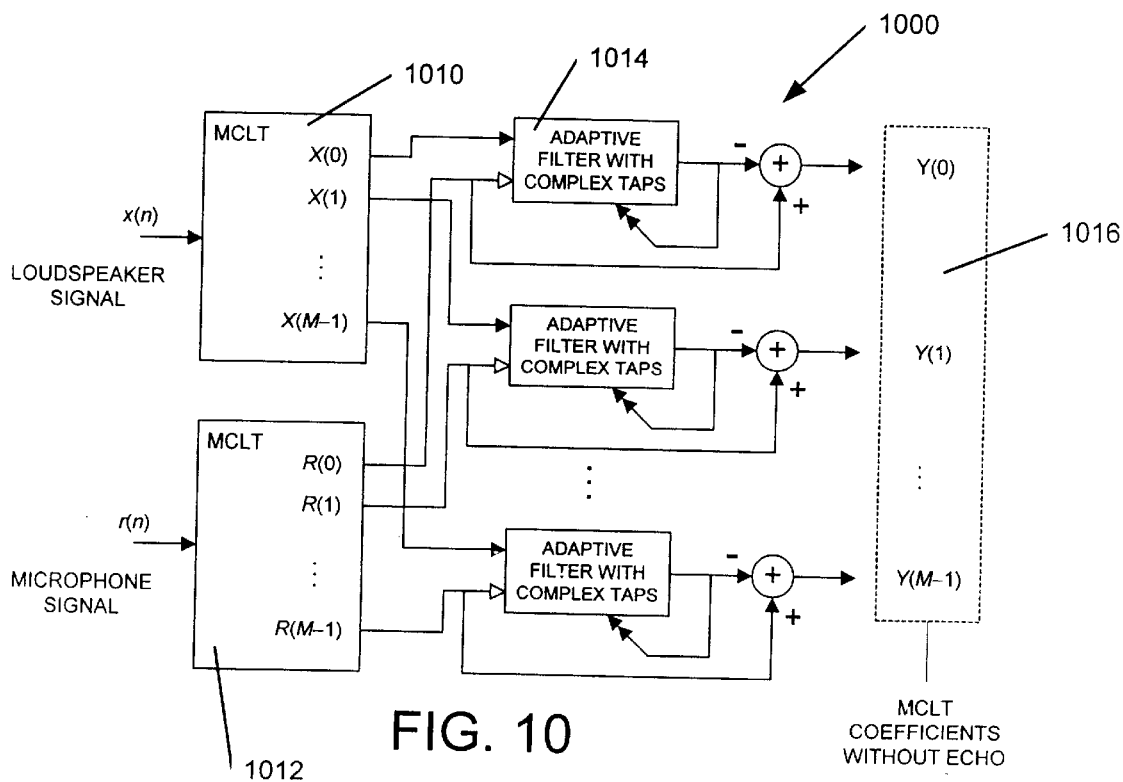
FIG. 10 is a general block diagram of an acoustic echo cancellation device with MCLT-based adaptive filters in accordance with the present invention.

FIG. 10 is a general block diagram of an acoustic echo cancellation device (AEC) with MCLT-based adaptive filters in accordance with the present invention. In general, referring to FIGS. 8–9 along with FIG. 10, the AEC 1000 of FIG. 10 includes a first MCLT processor 1010 for receiving and processing a loudspeaker signal as an input signal x(n) for producing input signal vectors X(0) through X(M−1) and a second MCLT processor 1012 for receiving and processing a microphone signal as a reference signal r(n) for producing reference signal vectors R(0) through R(M−1).

Also included in system 1000 are plural adaptive filters 1014 for receiving the input signal vectors X(0) through X(M−1) and the reference signal vectors R(0) through R(M−1). The adaptive filters estimate the echo within the signals, which are then combined with the reference signals for canceling the echoes and producing cleaned and corrected signal vectors, such as Y(0) through Y(M−1). An inverse modulated complex lapped transform processor (IMCLT) 1016 receives and processes the corrected signal vectors Y(0) through Y(M−1), which have MCLT coefficients without echo, for producing a final output signal with the echo canceled.

Subtraction of the estimated echo from the microphone signal is preferably performed for each subband, resulting in a set of subband signals Y(k) with the echo substantially removed.

The AEC and spectral subtraction can be combined using a single MLCT decomposition. For example, spectral subtraction can be applied to the subband signals immediately after the AEC adaptive filters. If the resulting signal is to be encoded by an MLT-based codec, then the MLT coefficients for the audio codec can be obtained by simply taking the real part of the outputs of the spectral subtraction. Therefore, only a single transformation step with the MCLT is necessary to perform simultaneous signal enhancement and coding.

If the waveform y(n) corresponding to the echo-cancelled subband signals Y(k) in FIG. 10 is desired, then an inverse modulated complex transform (IMCLT) can be performed on Y(k), as shown in FIG. 8. However, if the signals are to be encoded with an MLT-based coder/decoder (codec), such as MSAudio, then y(n) need not be computed since a codec can work directly with the Y(k) subband/transform coefficients.

One advantage of using the MCLT-based adaptive filters is that the MCLT uses short windows, which leads to low processing delay. Another advantage is that the MCLT allows for perfect signal reconstruction. Also, integrating an MCLT adaptive filter with an MLT-based processing system (for example, an audio codec) is very easy, since the MLT is obtained directly as the real part of the MCLT. Further, for a given number of subbands M (which is also the block size), a windowed Fourier transform decomposes the signal into M/2+1 distinct subbands. The MCLT breaks the signal into M subbands, and so it provides essentially twice the frequency resolution. Therefore, an MCLT-based adaptive filter will converge faster, because narrower subbands tend to have a flatter spectrum.

Figure 11:
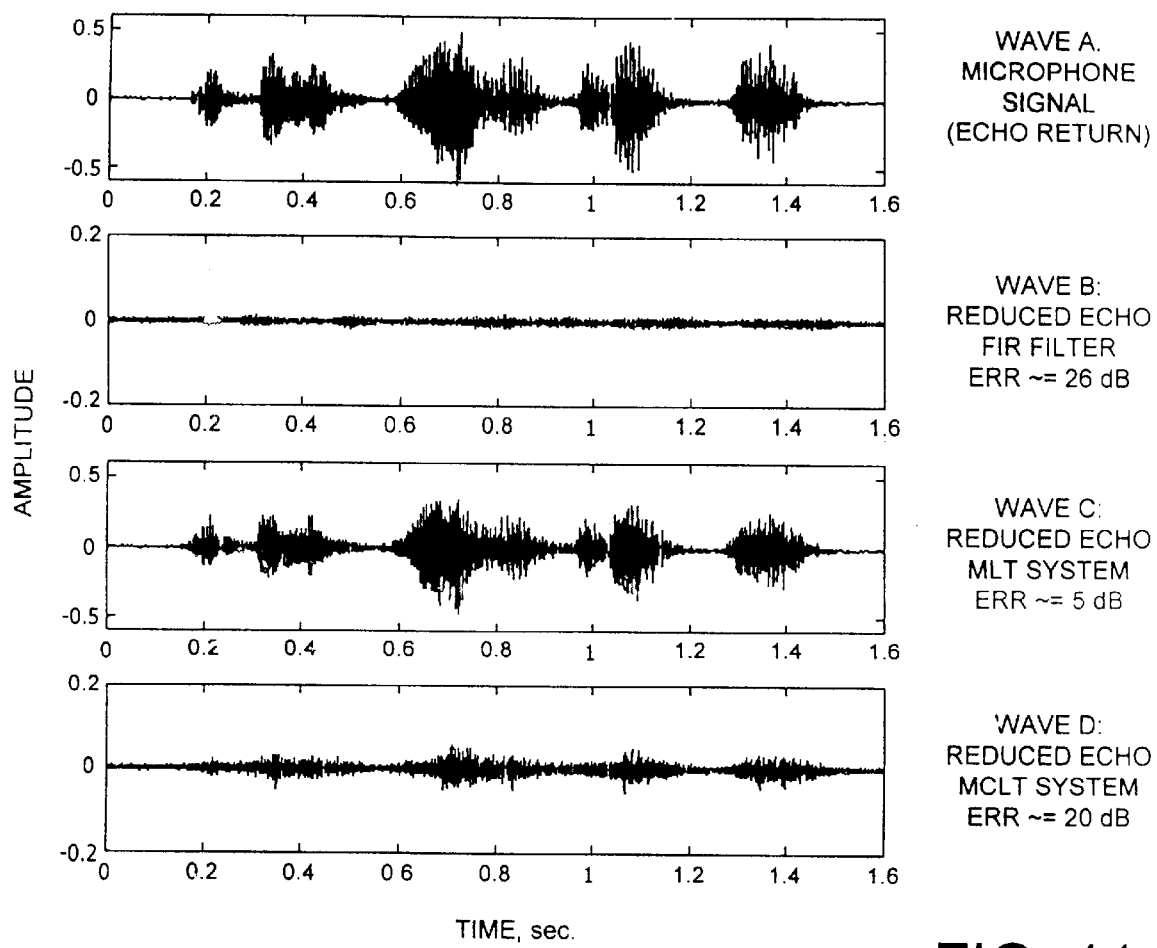
FIG. 11 is a wave signal illustrating sample results of the working example of FIG. 9.

FIG. 11 is a wave signal illustrating sample results of the working example of FIG. 9. The first wave signal (Wave A) is the microphone signal as a recorded echo return. The second wave signal (Wave B) is the output of a full-band AEC, echo reduction ratio (ERR)≈26 dB (it should be noted that the vertical scale is different). The third wave signal (Wave C) is an output of a 512-band MLT AEC without cross filters, ERR≈5 dB. The bottom wave signal (Wave D) is an output of a 512-band MCLT AEC without cross filters, ERR≈20 dB.

Specifically, the original signal is an actual echo return recorded at 16 kHz sampling from a microphone located at about 20" from the loudspeaker (using a 4" driver). The signals in FIG. 11 show the cancelled echo after convergence of each AEC (which takes a few seconds in all cases). The MLT and MCLT AECs used M=512 subbands and a four-tap adaptive filter in each band (corresponding to an echo window of about 128 ms). The echo attenuation for the MCLT is about 20 dB, which is adequate for many practical teleconferencing applications.

Noise Reduction

In addition, the MCLT of the present invention is amenable to other types of frequency-domain processing while allowing for perfect signal reconstruction. For instance, another kind of processing that can be efficiently performed in the frequency domain, especially with the MCLT, is noise reduction. For the audio/voice communication system in FIG. 9, even after the loudspeaker echo is cancelled the signal may still be noisy. The AEC usually removes feedback from the loudspeaker, but may not remove other noises, such as ambient noises that may be generated by computers and fans in an office.

An efficient approach to attack noise reduction is with spectral subtraction. For each subband k, the signal Y(k) is considered as having a desired signal and a noise component, in the form:

$$Y(k)=S(k)+N(k)$$

where S(k) is the desired signal and N(k) is the interfering noise. Assuming the signal and noise are uncorrelated, the energy of the subband signal is just the sum of the signal and noise energies:

$$|Y(k)|^2=|S(k)|^2+|N(k)|^2$$

With spectral subtraction, noise reduction is achieved by estimating the average noise magnitude |N(k)| during low-amplitude signals, i.e., during periods where |S(k)| is assumed to be zero. The variable $N_e(k)$ is the noise level estimate for the kth subband, which can be subtracted from Y(k), in the form $$|Y_f(k)|=|Y(k)|-\alpha(k)|N_e(k)|, \quad (A)$$

where $Y_f(k)$ is the filtered signal. As such, a portion of the estimated magnitude noise is subtracted from the magnitude of each subband signal. The phase is not affected, since the average noise phase is always zero. The parameters α(k) control how much of the noise estimate is subtracted from each subband signal, and so 0<α(k)<1 is preferably set. These parameters are preferably adjusted depending on the quality of the noise estimates. For example, if the noise estimate is significantly above the true noise level, the subtraction in eqn. (A) will remove part of the signal, also, leading to noticeable artifacts.

Figure 12:
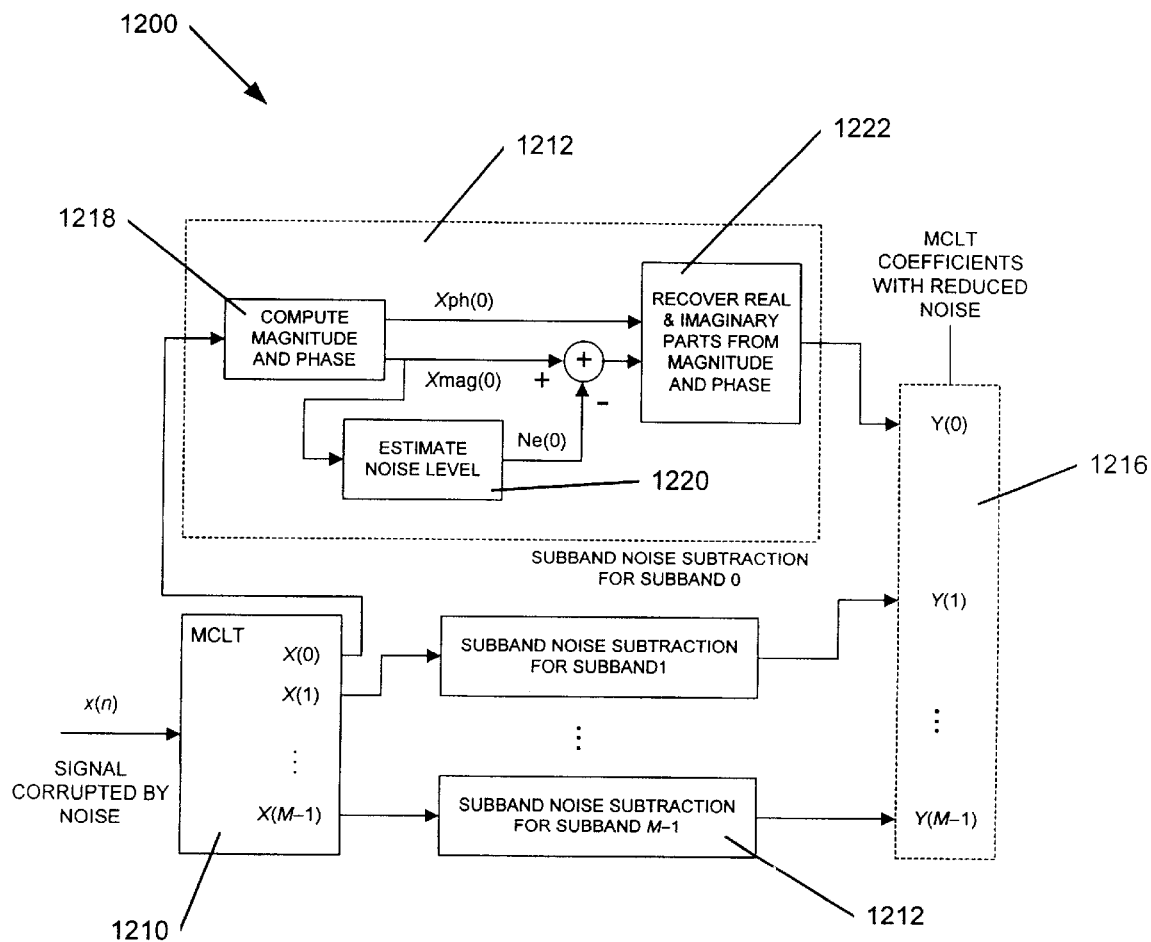
FIG. 12 is a general block diagram of a noise reduction device with MCLT-based adaptive filters in accordance with the present invention.

Specifically, FIG. 12 is a general block diagram of a noise reduction device with MCLT-based adaptive filters in accordance with the present invention. In general, the noise reduction device 1200 of FIG. 12 includes an MCLT processor 1210 for receiving and processing an input signal x(n) corrupted by noise for producing input signal vectors X(0) through X(M−1), plural subtraction devices 1212, such as subband noise subtraction devices and an inverse modulated complex lapped transform processor (IMCLT) 1216.

The plural subband noise subtraction devices 1222 receive the input signal vectors X(0) through X(M−1) and compute magnitude, Xmag(0) through Xmag(M−1), and phase, Xph(0) through Xph(M−1), information (box 1218). Noise levels, Ne(0) through Ne(M−1) are estimated from the magnitude, Xmag(0) through Xmag(M−1), information (box 1220). The noise level estimates are combined with the magnitude information for reducing the noise based on the noise level estimated to produce cleaned and corrected magnitude information, which is then sent to a recovery device 1222 for recovering the real and imaginary parts of this information. An inverse modulated complex lapped transform processor (IMCLT) 1216 receives and processes the corrected information as signal vectors Y(0) through Y(M−1), which have MCLT coefficients with reduced noise, for producing a final output signal with noise reduction.

Figure 13:
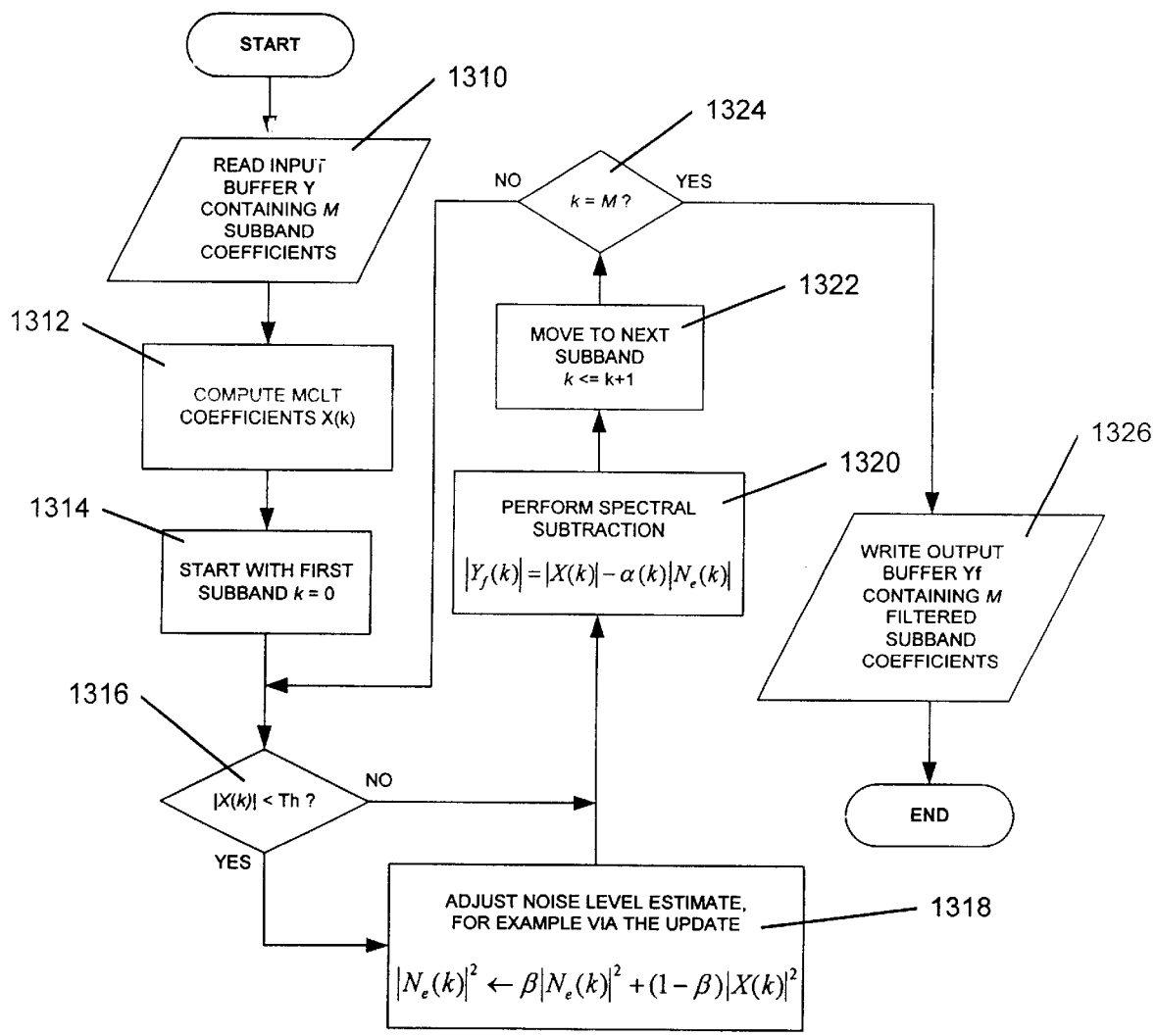
FIG. 13 is a flow diagram illustrating operational computation of a noise reduction device incorporating the modulated complex lapped transform of the present invention.

FIG. 13 is a flow diagram illustrating operational computation of a noise reduction device incorporating the modulated complex lapped transform of the present invention. Referring to FIG. 12 along with FIG. 13, first, an input buffer x containing M subband coefficients are read (box 1310) by MCLT processor 1210 of FIG. 12. Second, the MCLT coefficients X(k) are computed (box 1312) and this information is sent to the subband subtraction device 1212 of FIG. 12. Third, a first subband k=0 is analyzed (box 1314) by the subband subtraction device 1212 of FIG. 12. Fourth, it is determined whether a transform coefficient |X(k)| is less than a threshold value, Th. If it is, the noise level estimate is adjusted (box 1318), for example with an update function such as:

$$|N_e(k)|^2 \leftarrow \beta|N_e(k)|^2+(1-\beta)|X(k)|^2$$

If the coefficient |X(k)| is not less than the threshold value, Th, and after the above function is performed, spectral subtraction is performed (box 1320) by the subband subtraction device 1212 of FIG. 12, preferably with the following expression:

$$Y_f(k)=|X(k)|-\alpha(k)|N_e(k)|$$

Next, the subband subtraction device processes the next subband k=k+1 (box 1322). It is then determined whether k=M (box 1324). If not, the process returns to step 1316. Otherwise, last, an output buffer Y(k) containing M filtered subband coefficients is produced (box 1326) with reduced noise by the IMCLT 1216 of FIG. 12.

In practice, the noise reduction process is preferably performed right after the echo cancellation process of FIG. 10, otherwise the loudspeaker echo would interfere with the noise estimate and make it less reliable.

Although the spectral subtraction as in eqn. (A) can be performed with subband signals derived from a windowed Fourier transform, there are several advantages of using an MCLT instead of the Fourier transform. First, with the MCLT, perfect reconstruction of the signal can be obtained, which is important in low-noise, high fidelity applications. However, with a windowed Fourier transform, usually long windows are needed for good enough signal reconstruction, increasing the processing delay. Next, as discussed above, for a given number of subbands M (which is also the block size), a windowed Fourier transform decomposes the signal into M/2+1 distinct subbands. In contrast, the MCLT breaks the signal into M subbands, and so it provides essentially twice the frequency resolution. Therefore, an MCLT-based noise reducer allows for finer discrimination, which is important in reducing noise with periodic components, such as high-frequency tones generated by computer hard disks.

Figure 14:
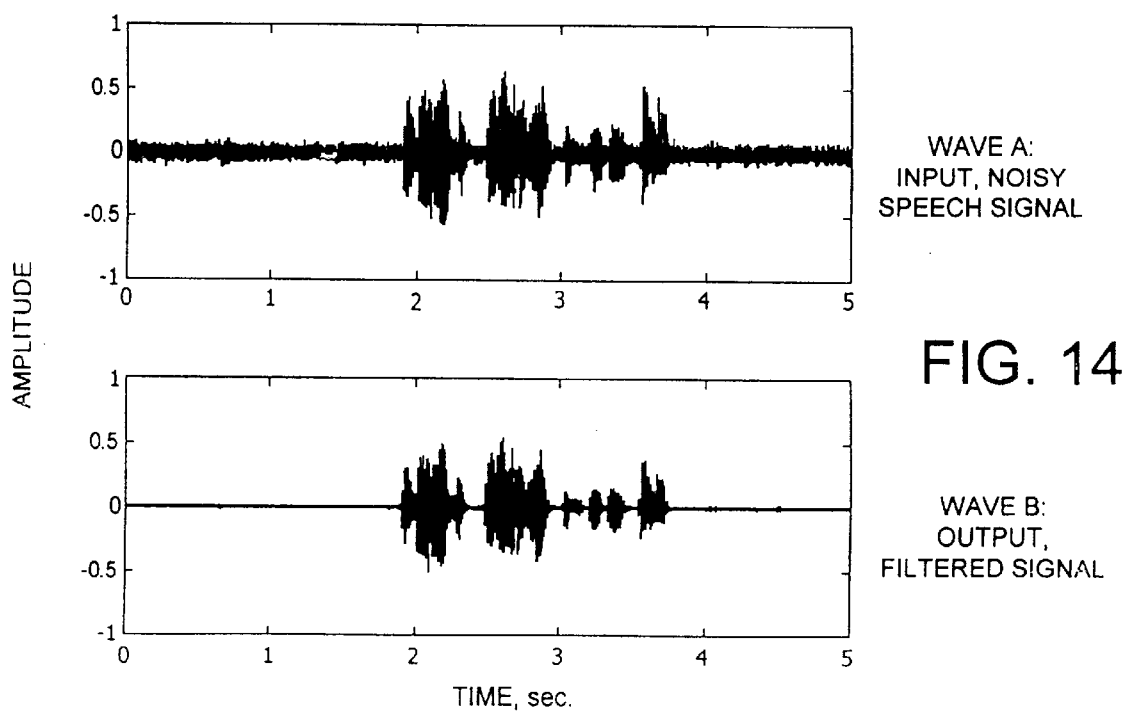
FIG. 14 is a wave signal illustrating sample results of the working example of FIGS. 12–13.

FIG. 14 is a wave signal illustrating sample results of the working example of FIGS. 12–13 using the MCLT of the present invention with spectral subtraction. The top wave signal (Wave A) is the original speech, corrupted by PC noise, SNR≈15 dB and the bottom wave signal (Wave B) is the processed speech, SNR≈30 dB.

Specifically, an original 8-second speech signal was captured at 16 kHz sampling rate, with the microphone near a very noisy personal computer (PC), whose noise spectrum is approximately pink. The depth of subtraction for a noise reduction of about 15 dB was adjusted. The results are shown in FIG. 14, where the signal-to-noise ratio (SNR) was successfully increased from 15 dB to 30 dB. More importantly, the processed file has fewer artifacts than the results obtained using a commercial product that uses standard DFT filter banks for spectral subtraction.

Integrating AEC, Noise Reduction, and Codec

As discussed above, in a communication system the AEC does not need to perform an inverse MCLT after the adaptive filters in each subband, if the codec that follows operates in the frequency domain. Thus, the same principle applies when the noise reduction process of eqn. (A) is added. For example, after computing the subband signals $Y_f(k)$ at the output of the AEC, the noise reduction step is applied to generated the filtered subband coefficients $Y_f(k)$, which are then sent directly to the codec,. without the need to return to the corresponding time-domain signal. If the codec does not operate in the frequency domain (such as most telephony codecs), then the echo-cancelled and noise filtered signal $y_f(n)$ can be obtained simply by computing an inverse MCLT on the subband signals $Y_f(k)$.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for processing a signal, said method comprising:

applying butterfly coefficients determined by a real and an imaginary window function to a received input signal to respectively produce real and imaginary resulting vectors;

storing a portion of the real and imaginary resulting vectors in a memory of a one block delay buffer and recovering current contents of the delay buffer; and computing real and an imaginary spatial transforms of the real and imaginary resulting vectors, respectively, to produce a modulated complex lapped transform having real and imaginary transform coefficients as an encoded output.

2. The method of claim 1, wherein the encoded output is produced as a vector with modulated complex lapped transform coefficients corresponding to the input signal.

3. The method of claim 1, further comprising processing the encoded output by at least one of transmitting the output, storing the output, compressing the output, enhancing the output, and filtering the output.

4. The method of claim 3, wherein filtering the output comprises reducing interference within the input signal with a noise reducer.

5. The method of claim 3, wherein filtering the output comprises reducing interference within the input signal with an echo canceller.

6. The method of claim 3, wherein compressing the output is achieved by at least one of scalar and vector quantization.

7. The method of claim 1, wherein the window functions are adapted for reducing blocking effects.

8. The method of claim 1, wherein the real spatial transform is performed by a discrete cosine transform operation.

9. The method of claim 1, wherein the imaginary spatial transform is performed by a discrete sine transform operation.

10. The method of claim 1, wherein half of the resulting vectors are stored in a memory of a one block delay buffer.

11. A system for computing a spatial transform of an input signal, the system comprising:

a general purpose computing device; and a computer program comprising program modules executable by the computing device, comprising:

a window processor module having real and imaginary window functions for receiving the input signal and for applying butterfly coefficients determined by the real and imaginary window functions to produce resulting real and imaginary vectors, respectively; and a transform processor module having real and imaginary transform modules for respectively computing real and imaginary spatial transforms from the resulting vectors to produce a modulated lapped transform having real and imaginary transform coefficients as an output signal.

12. The computation system of claim 11, wherein the output signal is produced as a vector with the transform coefficients corresponding to the input signal.

13. The computation system of claim 11, further comprising an external module for processing the output signal by at least one of transmitting the output, storing the output, compressing the output, enhancing the output, and filtering the output.

14. The computation system of claim 11, wherein the window functions are adapted for reducing blocking effects.

15. The computation system of claim 11, wherein the real transform module is a discrete cosine transform operator and the imaginary transform module is a discrete sine transform operator.

16. The computation system of claim 11, wherein the output signal is produced as a vector with biorthogonal modulated complex lapped transform coefficients corresponding to the input signal.

17. The computation system of claim 11, wherein each window processor further comprises a memory of a one block delay buffer for storing a portion of the respective resulting vectors in the memory of a one block delay buffer and for recovering current contents of the delay buffer.

18. A method for performing spectral analysis by receiving an input signal represented by a sample block comprising:

spectrally decomposing an input signal at predefined frequencies uniformly distributed over a sampling frequency interval into complex frequency coefficients so that magnitude and phase information at each frequency is immediately available, by applying butterfly coefficients to the input signal using a real and an imaginary window function to respectively produce real resulting vectors and an imaginary window function to produce imaginary resulting vectors, and producing the output signal having modulated complex transform coefficients including real modulated complex transform coefficients and imaginary complex transform coefficients using the real resulting vectors and the imaginary resulting vectors; and producing an output signal as modulated complex lapped transform coefficients including real modulated complex transform coefficients and imaginary modulated transform coefficients using the complex frequency coefficients.

19. The method of claim 18, wherein the output signal is produced as a vector with the real modulated transform coefficients and imaginary modulated complex transform coefficients corresponding to the input signal.

20. The method of claim 18, further comprising processing the output signal by at least one of:

transmitting the output signal, storing the output signal, compressing the output signal, enhancing the output signal, and filtering the output signal.

21. The method of claim 18, further comprising storing a portion of the real and imaginary resulting vectors in a memory of a one block delay buffer and recovering current contents of the delay buffer.

22. The method of claim 18, wherein the window functions are adapted for reducing blocking effects.

23. The method of claim 18, wherein the real spatial transform is performed by a discrete cosine transform operation.

24. The method of claim 18, wherein the imaginary spatial transform is performed by a discrete sine transform operation.

25. The method of claim 21, wherein half of the resulting vectors are stored in a memory of a one block delay buffer.

26. A computer-readable medium having computer-executable instructions for computing a spatial transform, said computer executable instructions comprising:

applying butterfly coefficients determined by a real and an imaginary window function to a received input signal to respectively produce real and imaginary resulting vectors;

storing a portion of the real and imaginary resulting vectors in a memory of a one block delay buffer and recovering current contents of the delay buffer; and computing real and an imaginary spatial transforms of the real and imaginary resulting vectors, respectively, to produce a modulated complex lapped transform having real and imaginary transform coefficients as an encoded output.

27. The computer-readable medium of claim 26, wherein the encoded output is produced as a vector with modulated complex lapped transform coefficients corresponding to the input signal.

28. The computer-readable medium of claim 26, further comprising computer-executable instructions for processing the encoded output by at least one of:

transmitting the output, storing the output, compressing the output, enhancing the output, and filtering the output.

* * * * *

UNITED STATES PATENT AND TRADEMARK OFFICE
CERTIFICATE OF CORRECTION

PATENT NO. : 6,487,574 B1
DATED : November 26, 2002
INVENTOR(S) : Henrique S. Malvar It is certified that error appears in the above-identified patent and that said Letters Patent is hereby corrected as shown below:

Column 9,
Line 51, equation should appear as follows:

$$p_a^s(n,k) = h_a(n)\sqrt{\frac{2}{M}}\sin\left[\left(n+\frac{M+1}{2}\right)\left(k+\frac{1}{2}\right)\frac{\pi}{M}\right]$$

Signed and Sealed this

Third Day of June, 2003

JAMES E. ROGAN
*Director of the United States Patent and Trademark Office*